(12) United States Patent
Rekik et al.

(10) Patent No.: US 11,604,818 B2
(45) Date of Patent: Mar. 14, 2023

(54) BEHAVIORAL CURATION OF MEDIA ASSETS

(71) Applicant: Apple Inc., Cupertino, CA (US)

(72) Inventors: Sabrine Rekik, San Francisco, CA (US); Marcos Regis Vescovi, Capitola, CA (US); Eric Circlaeys, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 16/560,159

(22) Filed: Sep. 4, 2019

(65) Prior Publication Data

US 2020/0356589 A1 Nov. 12, 2020

Related U.S. Application Data

(60) Provisional application No. 62/844,048, filed on May 6, 2019.

(51) Int. Cl.
*G06F 16/43* (2019.01)
*G06F 16/41* (2019.01)
*G06F 16/48* (2019.01)
*G06F 16/58* (2019.01)
*G06F 16/435* (2019.01)
*G06F 16/483* (2019.01)
(Continued)

(52) U.S. Cl.
CPC ............ *G06F 16/435* (2019.01); *G06F 16/41* (2019.01); *G06F 16/434* (2019.01); *G06F 16/483* (2019.01); *G06F 16/5854* (2019.01)

(58) Field of Classification Search
CPC .. G06F 16/435; G06F 16/483; G06F 16/5854; G06F 16/434; G06F 16/44; H04N 21/25891; H04N 21/251; H04N 21/4312
See application file for complete search history.

(56) References Cited

U.S. PATENT DOCUMENTS 8,843,491 B1 * 9/2014 Mazniker .......... G06F 16/24578
707/737
10,674,214 B2 * 6/2020 Carlson ................. G06F 16/489
(Continued)

FOREIGN PATENT DOCUMENTS

CN 101601007 A 12/2009
CN 104881798 A 9/2015
(Continued)

OTHER PUBLICATIONS

Williams, Iain, WO 2014/087555 AI, PCT/JP20 13/004608 ; Dec. 6, 2012 (Year: 2012).*
(Continued)

*Primary Examiner* — Mohsen Almani
(74) *Attorney, Agent, or Firm* — Invoke

(57) ABSTRACT

In some implementations, a computing device may create a semantic mapping that includes identified features that appear in a particular percentage of assets in a subset of assets of a media library. Also, the computing device may analyze assets of the media library using the semantic mapping to generate semantic scores, which may be used to determine a first tier of assets from the media library that rate highest for semantic score out of all assets. The computing device may present at least one of the first tier assets prominently in a user interface when viewing assets of the media library.

17 Claims, 10 Drawing Sheets

(51) Int. Cl.
*G06F 16/583* (2019.01)
*G06F 16/432* (2019.01)

(56) References Cited

U.S. PATENT DOCUMENTS

| | | | |
|---|---|---|---|
| 10,691,740 B1* | 6/2020 | Anorga | G06F 16/54 |
| 10,841,640 B2* | 11/2020 | Patel | H04N 21/4316 |
| 2012/0269441 A1* | 10/2012 | Marchesotti | G06K 9/6269 |
| | | | 382/195 |
| 2013/0055088 A1 | 2/2013 | Liao et al. | |
| 2013/0336543 A1* | 12/2013 | Bennett | G06V 40/10 |
| | | | 382/100 |
| 2014/0149427 A1* | 5/2014 | Wilder | G06F 16/44 |
| | | | 707/749 |
| 2014/0351264 A1* | 11/2014 | Murray | G06F 16/583 |
| | | | 707/748 |
| 2015/0347515 A1 | 12/2015 | Callender et al. | |
| 2015/0363409 A1* | 12/2015 | Wood | G06F 16/44 |
| | | | 707/738 |
| 2016/0127763 A1 | 5/2016 | Patel et al. | |
| 2016/0142783 A1* | 5/2016 | Bagga | H04N 21/4532 |
| | | | 725/47 |
| 2017/0093780 A1* | 3/2017 | Lieb | H04L 51/18 |
| 2017/0185669 A1* | 6/2017 | Chang | G06F 16/438 |
| 2017/0372192 A1 | 12/2017 | Whritenor et al. | |
| 2018/0089203 A1* | 3/2018 | Soni | G06F 16/738 |
| 2018/0096397 A1 | 4/2018 | Goeldi et al. | |
| 2018/0219814 A1 | 8/2018 | Maarek et al. | |
| 2018/0249193 A1 | 8/2018 | Zhang et al. | |

FOREIGN PATENT DOCUMENTS

| | | |
|---|---|---|
| CN | 107870959 A | 4/2018 |
| CN | 108476259 A | 8/2018 |
| CN | 109408185 A | 3/2019 |
| JP | 2014-081957 A | 5/2014 |
| WO | 2014/087555 A1 | 6/2014 |

OTHER PUBLICATIONS

Cuixia M. et al., "Video sketch summarization, interaction and cognition analysis," Science China: Information Science, No. 8, 2013, pp. 1012-1023. (English abstract only).

Guidazzoli. A. et al., "Crossmedia Integration of 3D Contents for Cultural Communication," The True Vision—Capture, Transmission and Display of 3D Video, 2014, p. 4.

Xingrun W. et al., "Video summarization based on learning to rank," CAAI transactions oil intelligent systems, vol. 13, Issue 6, 2018, pp. 921-927. (English Abstract only).

* cited by examiner

BEHAVIORAL CURATION OF MEDIA ASSETS

TECHNICAL FIELD

The disclosure generally relates to displaying assets of a media library, and more particularly to filtering and selecting particular media assets to show based on user behavior.

BACKGROUND

Conventional media libraries display all images and videos contained therein in one or more interfaces. The pictures and videos may be sorted according to a sorting parameter, such as a time of capture, alphabetically by filename, etc. However, for large media libraries that include hundreds or thousands of images and videos, such a presentation may be too cumbersome for a user to manage, too slow to load, and too burdensome for the user to navigate in order to view desired images and videos.

Moreover, many images and videos may be of great interest to a user, but because of the shear volume of images and videos stored to the media library, it may not be possible for the user to come across these interesting images and videos under normal circumstances to allow the user to view the interesting images and videos. Therefore, these interesting images and videos may stay hidden away in the media library and underutilized.

SUMMARY

In some implementations, a computing device may create a semantic mapping that includes identified features that appear in a particular percentage of assets in a subset of assets of a media library. Also, the computing device may analyze assets of the media library using the semantic mapping to generate semantic scores, which may be used to determine a first tier of assets from the media library that rate highest for semantic score out of all assets. The computing device may present at least one of the first tier assets prominently in a user interface when viewing assets of the media library.

Particular implementations provide at least the following advantages. By selecting assets to display to a user that are specific to that user based on past interactions with other assets in the media library, it is possible to show the user assets that may be hidden or older and not commonly shown, but are predicted to be favored by the user. This eliminates the need for the user to sort through many assets to find one that is visually pleasing or has special meaning to the user out of all the assets in the media library. This saves time and effort for the user, and avoids causing frustration to the user in trying to access meaningful assets from the media library.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Large, vast media libraries of photos, images, videos, and other media assets have become commonplace since the advent of digital cameras. More particularly, these large media libraries have become common since the incorporation of digital cameras into mobile devices, such as smart phones and other electronic devices, that are easily transportable by users and carried on a daily basis to easily allow users to snap pictures and take videos to catalog their lives.

Media assets, as used herein, may include digital photos and images, videos, animated images, composite presentations and compilations, etc. A large media library may include multiple hundreds and even thousands of individual images and videos that have been collected over years by one or more users, and stored to one or more locations. When a user attempts to access a large media library, there may be many issues associated with the vast quantity of images and videos included therein, such as difficulty in locating a desired image or video within the numerous assets stored to the media library, slow loading times for the individual assets, slow response times for user interactions with the media library (such as scrolling through the images and videos, selecting a particular image to display, transitioning between display types, etc.), losing track of photos after capturing them (forgetting that the photo was taken, when it was taken, etc.), etc.

Moreover, users typically do not want to view all of their images, videos, and other assets from the media library, or through other applications. Instead, a user will typically want to view assets which have a special significance and/or beauty particular to the individual user. These best images and videos for one user may not be the same images and videos determined to be the best for another user. Therefore, each user's media library, in examples described herein, may be managed individually for the specific user and those images, videos, and other assets that are determined to hold special significance and/or beauty particular to the individual user may be determined to be the best assets for that user. These best assets may be promoted within views of the media library and/or within other applications that display assets of the media library. In this way, embodiments described herein provide an enhanced user experience to more easily gain access to the best assets of the media library.

Figure 1:
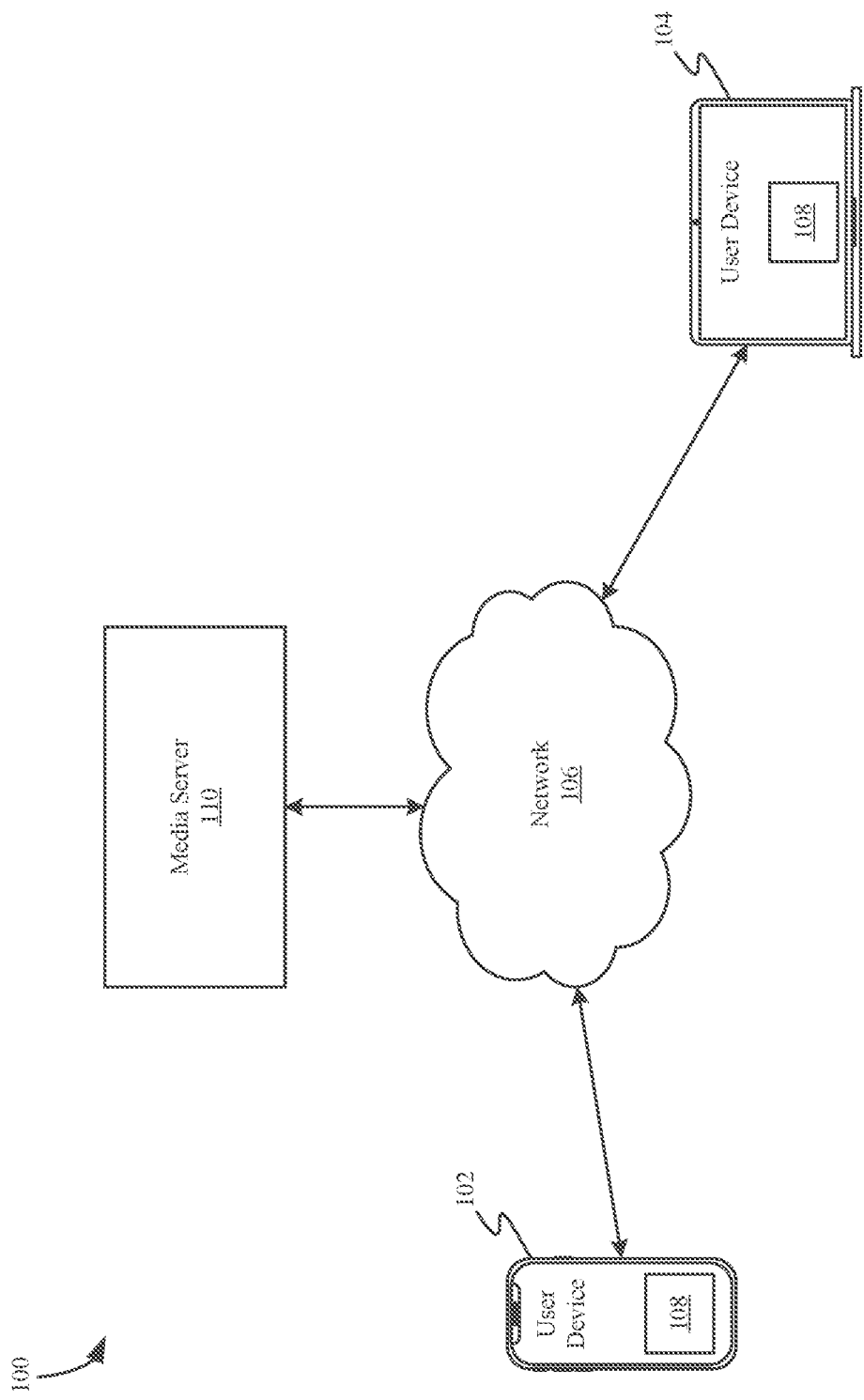
FIG. 1 is a block diagram of an example system for curating assets of a media library.

FIG. 1 is a block diagram of an example system 100 for curating assets of a media library. System 100 may include multiple user devices, e.g., smartphone 102, laptop 104, etc.

Each user device 102, 104 may include a media-viewing application 108 that is configured to display assets accessible to the particular user device on which media-viewing application 108 is executing, such as assets stored locally to the particular user device. Moreover, in one example, any of user devices 102, 104 may be configured to connect to a media server 110 to allow media-viewing application 108 to access additional assets that are stored remotely to media server 110 (and may not be local to the particular user device). In one approach, media-viewing application 108 may display remotely-stored and/or locally-stored assets in a graphical user interface (GUI) on user devices 102, 104. In another approach, assets may be synchronized across multiple user devices 102, 104, with or without the use of the media server 110.

Any type of user device (including those not specifically shown in FIG. 1) may be included in system 100, such as desktop computers, media devices like set-top boxes (STBs), mobile phones, digital streaming devices, smart televisions (TVs), tablet computers, wearable devices like smartwatches, home-based smart speakers with displays, digital picture frames, etc.

The media library, although not shown, may be configured to store, manage, and display a plurality of assets. The assets may be accessed by a user interacting with the media library or using an application configured to access assets from the media library. Any type of asset may be shown in the media library, such as images, photos, videos, animated images, composite presentations, etc.

An animated image, as used herein, describes a container or other file format that includes a series of images that are manipulated or processed to appear as a coherent moving image when opened or played. The animated image may automatically play whenever it is displayed, or some input may activate the playing of the animated image in two approaches. Some example animated images include, but are not limited to, graphics interchange format (GIF) files, portable network graphics (PNG) files, multiple-image network graphics (MNG) files, Live Photos™, etc.

A composite presentation, as used herein, describes an arrangement of media assets, such as images and/or videos, that are selected according to a theme or purpose, and may be set to audio or music. A composite presentation may also include related information, such as graphics, maps, information about people identified in assets, details about assets included in the composite presentation. For example, a composite presentation may be directed to a weekend ski trip, and may include videos and photos from the ski trip, such as pictures of family members surrounding a firepit drinking hot cocoa followed by an image of the ski resort, photos of a child wearing ski clothing, and then videos of family members skiing down the slopes. Of course, the order of the assets, the music and other audio played, titles, text or audio descriptions, etc., may be set or modified, as desired by a user of an application which generates the composite presentation.

Media-viewing application 108 may be configured to present assets that are accessible from the media library via user devices 102, 104. Media-viewing application 108 may be any type of application, program, module, set of instructions, operating system, firmware, etc., that is configured to display pictures, images, videos, and/or other media assets that are captured by media-viewing application 108, accessed from local storage on user devices 102, 104, remote storage of a media server 110, and/or obtained from some other data source. Some example media-viewing applications include, but are not limited to, a social media platform available online, a camera module for a mobile phone or smartphone, a video recorder program, etc.

In an example, media-viewing application 108 may be a social media application installed on smartphone 102, and the social media application may present a set of photos to a user based on a shared characteristic or trait that is discovered in the photos, such as a location where the photos were captured. The set of photos may be stored to the media library, with the social media application having permission to access the photos from the media library to present within a GUI of the social media application on a display of smartphone 102, such as in a timeline or calendar view. In a further example, the user may be presented with an option of whether the social media application is allowed to present the set of photos prior to the social media application displaying the photos with other users and/or devices. It would be beneficial for only the best of the photos from the media library to be provided to the social media application for display based on certain selection criteria. The selection criteria may indicate a date, holiday, trip, theme, mood, scene, people, places, and/or objects to appear in the selected assets.

Referring again to FIG. 1, in one approach, user devices 102, 104 may utilize a network 106 to access media server 110, or any other remotely accessible data source. Any type of network 106 may be utilized, such as the Internet, wide area network (WAN), local area network (LAN), wireless local area network (WLAN), virtual private network (VPN), mobile broadband network, etc. Moreover, in an approach, more than one network may be used to connect a user device 102, 104 to any other system, device, or network.

Media server 110 may be any type of system or device that is configured to store assets, and provide access to and/or transfer such assets to a requesting user device 102, 104. In one example, media server 110 may be a cloud server that hosts images, videos, and other assets so that they may be accessed, on demand, by user devices 102, 104. In a further approach, media-viewing application 108 may be a client application that relies on media server 110 to provide instructions and/or assets for display on user devices 102, 104.

In one approach, each of the various user devices 102, 104 may all be utilized by a single user and/or the user may enter credentials that allow for the user to be identified when using a shared device. The credentials may be entered passively, such as using a device particular to the user, or explicitly, such as a username/password combination, biometric signature, token exchange, etc.

Because use of and interaction with assets from the media library by the user may be tracked across all of the different user devices 102, 104 that are available for the user to access the plurality of assets of the media library, an overall coherent portrayal of how the user interacts with the plurality of assets in the media library may be generated in an approach.

Figure 2:
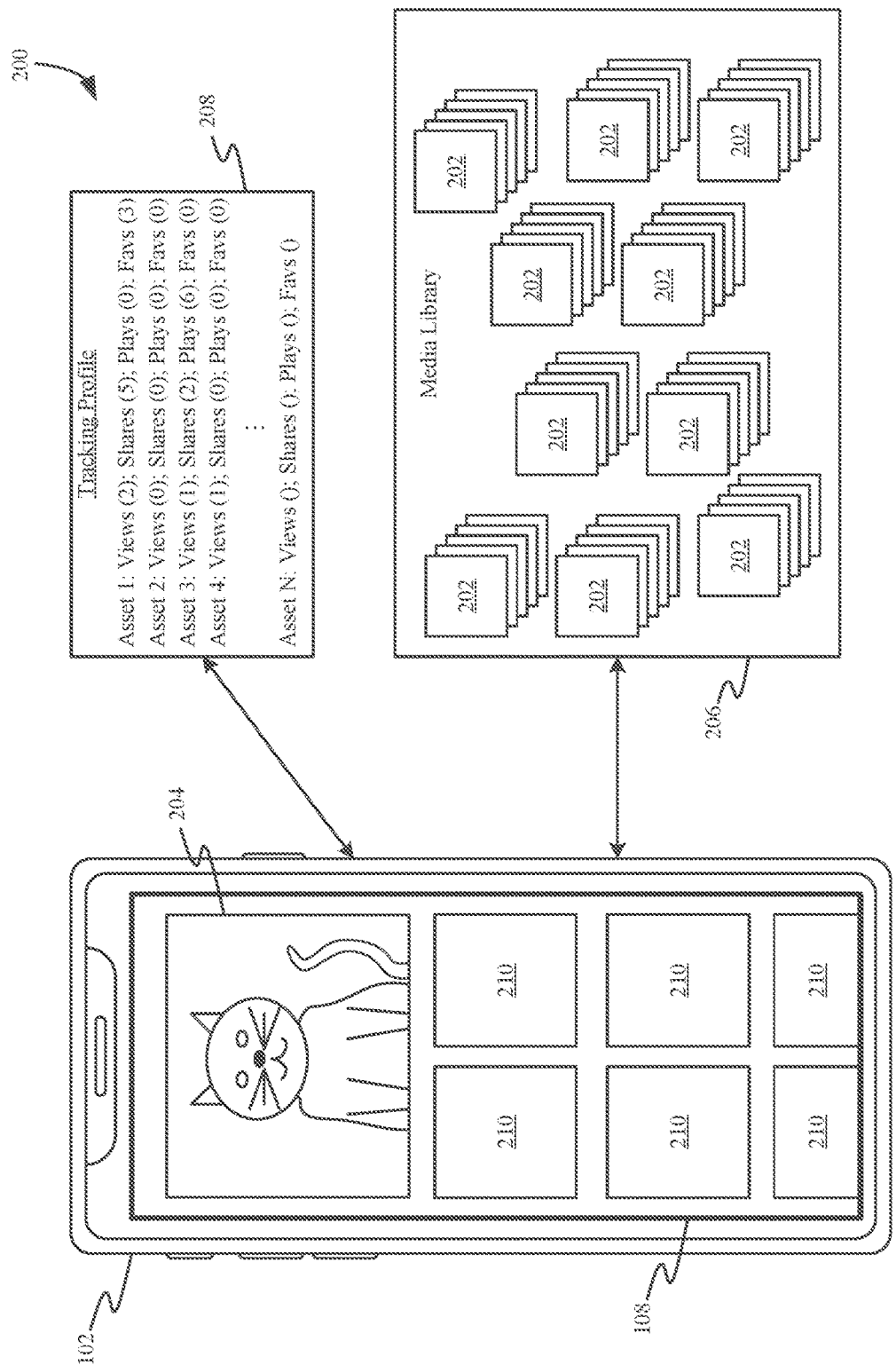
FIG. 2 shows an example system for tracking user interactions with assets of a media library.

FIG. 2 shows an example system 200 for tracking user interactions with assets 202 of media library 206. As shown, smartphone 102 is running media-viewing application 108. Media-viewing application 108, over a period of time, may display and allow interaction with many different assets 210 from media library 206. However, as an example, just because a certain photo 204, e.g., a photo of a cat, is shown on a display of smartphone 102, it does not necessarily mean that the user actually likes photo 204. Maybe the user does not like cats, or maybe the user does not like this particular cat, or maybe the lighting in the photo is bad making it difficult to see the cat. There are many different factors that go into how a user perceives a photo or other assets and any of these factors may be considered in generating a coherent portrayal of the user's interactions with assets 210 of media library 206. Additionally, the example system 200 is not limited to being used with a smartphone 102, and any computing device may be utilized in example system 200, such as a desktop computer, a media device like a STB, a digital streaming device, a mobile phone, a smart TV, a tablet computer, a wearable device like a smartwatch, a home-based smart speaker with a display, a digital picture frame, etc.

In an example, each time the user performs certain interactions with an asset, such as cat photo 204, of media library 206, it is stored to a user profile 208 specific to the user. The user profile 208, in an approach, is created by the media-viewing application 108 and stored locally to the smartphone 102. In some further approaches, different instances of the media-viewing application 108 may share and/or synchronize a user profile 208 for a particular user who utilizes multiple user devices to interact with assets 202 of the media library 206. In one approach, this sharing or synchronization occurs only after receiving permission from the user. In this way, all user interaction with assets 202 of the media library 206 may be aggregated together and used to determine user interest in particular assets, instead of relying on interactions performed on a single and computing the user interest for the single device only.

User profile 208 may include information about each interaction with every asset 202 of media library 206 that is interacted with by the user, e.g., assets 204 and 210 shown on the display of smartphone 102. As an example, entries are shown for Asset 1, Asset 2, Asset 3, Asset 4, . . . , Asset N in user profile 208. Certain information is stored in each entry for assets that have been accessed by the user of smartphone 102. In an example, interactions within a certain time period may be tracked, and tracked interactions may expire once the time period has passed in one approach. In another approach, a value may be assigned to the interactions in an interaction score. Interaction scores may be calculated as described herein or using any other suitable method, and may involve non-linear relationships including sigmoids and other exponential or higher level polynomial functions. In a further approach, the value assigned may time-decay based on an age of the tracked interaction. In another example, each asset 202 in media library 206 may have an entry, and for assets that are not accessed or have not been accessed within a certain recent time period, the entries may be blank or include little or no interaction information.

Some example information stored in entries of user profile 208 may include, but is not limited to, a number of times the user views an asset on smartphone 102, a number of times the user shares an asset with one or more other people or devices, a number of times the user plays an asset capable of being played (e.g., a video, animated image, composite presentation, etc.), a number of times the user indicates liking an asset and/or marking an asset as being a favorite on one or more applications, platforms, etc., a number of substantially similar assets stored to media library 206, a timestamp indicating recency of interaction(s) with an asset, indication of special settings that were made to an image capture device to obtain an asset (e.g., camera settings for capturing a photo, special photo types like panorama or slow-motion, altering an appearance of a photo prior to capture with filters, etc.), post-capture edits performed on an asset (e.g., loop, bounce, long-exposure, post-capture filter effects, etc.), etc.

For example, each entry of user profile 208 includes a name or identifier for the related asset, e.g., Asset 1, a number of times the user viewed Asset 1, e.g., Views (2), a number of times the user shared Asset 1, e.g., Shares (5), a number of times the user played Asset 1, e.g., Plays (0), and a number of times Asset 1 has been marked as a favorite, e.g., Favs (3).

User profile 208 may be used to generate an interaction score for each asset that has an entry in user profile 208. The respective interaction scores may be based on a summation of individual contributor values assigned to each interaction type. Moreover, weights may be assigned to increase or reduce an effect that any type of interaction may have on the interaction score. In one approach, all weights may be set equal, so that each interaction type provides the same effect on the overall interaction score.

According to this approach, certain types of interactions may be weighted more than other types of interactions in calculating interactions scores for the assets. For example, a share may be weighted to be twice as influential on an interaction score as a view, playing an asset may be contribute to an interaction score three times that of a favorite, etc.

For example, with even weighting, Asset 1 may have an interaction score equal to a summation of the number of views, shares, plays, and favorites, e.g., 2+5+0+3=10, indicating that it has been interacted with by the user ten total times in different ways. In another example, Asset 2 may have an interaction score of 0, indicating that it has not been interacted with by the user. In these examples, the higher the score, the more interaction has occurred for a particular asset.

In one approach, interaction scores may be normalized to a scale of 0 to 1 based on a highest calculated score. To achieve normalization, each interaction score is divided by the highest calculated score, such that the highest calculated score becomes a score of 1.0, and all other interaction scores are somewhere between and including 0 and 1. For example, Asset 1 would have the highest interaction score of 10, normalized to 1.0. Asset 3 would have a normalized interaction score of (1+2+6+0)/10=0.9, while Asset 4 would have a normalized interaction score of 1/10=0.1.

Normalization may also be achieved with other calculations, such as feature scaling, mean normalizations, etc. In one example, a normalization scheme may use a first calculation where normalized score=score−average/(maximum−minimum). In another example, normalized score=score−average/standard deviation. According to another example, normalized score may be obtained based on a global score calculated from other users scores.

In an approach where the number of plays for an asset are weighted to be double the effect of the other criteria, Asset 3 would have an interaction score of 1+2+6*2=15. Therefore, with this weighting scheme, Asset 3 would have a higher interaction score than Asset 1, which has 0 plays tracked.

Any scheme, algorithm, calculation, or method may be used to generate the interaction scores for assets 202 of media library 206 as would be apparent to one of skill in the art, and calculation, determination, and/or generation of interaction scores is not limited to explicit descriptions provided herein.

Once the interaction scores are determined for assets 202 of media library 206, a subset of assets from media library 206 may be determined based on the interaction scores. The subset of assets may include those assets which achieved interaction scores of greater than a threshold score, such as 0.5, 0.7, 0.75, 0.8, 0.9, etc., for interaction scores normalized to a 1.0 scale. In another approach, the subset of assets may have a predetermined size (e.g., a quantity or percentage of all assets), and the assets which have the highest interaction scores fill the subset of assets to achieve the predetermined size.

There may be many different reasons as to why the particular user likes a particular photo, video, or other asset. Some reasons the particular user may like an asset may relate to an aesthetic appeal of the asset, which may be characterized by delight and beauty, such as a breathtaking landscape, artistic intent, pretty faces and people, etc.

These reasons for the particular user liking an asset may be globally consistent for most users, because the concept of aesthetic appeal may be approximated based on characteristics and traits of the subject(s) of the asset. In one example, an aesthetic appeal of an asset may be estimated based on a global aesthetic created by experts on the subject of aesthetic appeal, such that an aesthetic score may be generated for each individual asset of the media library 206, as discussed in more detail later.

Some more reasons the particular user may like an asset may relate to emotions and feelings that the user attaches to the asset due to content shown in the asset, such as images of significant people (e.g., celebrities liked by the user, images of famous people alone or with other people, relatives, friends, spouses, children, loved ones who have passed away, etc.), places of significance (e.g., places the user wants to visit, places the user has visited in the past, a place the user lives currently, places the user has lived previously, where friends or loved ones live, etc.), pets and other animals with meaning to the user, objects of significance to the user (stuffed animals, sports teams and memorabilia, etc.), etc. More reasons the particular user may like an asset may relate to a lifestyle or way of living, such as activities liked by the user (sports, travel, adventure, road trips, hiking, camping, etc.), hobbies (crafting, maker events, etc.), etc. Even more reasons the particular user may like an asset may relate to intellectual stimulation, curiosity, knowledge seeking, etc., e.g., landmarks, cultural locations and experiences (e.g., events specific to certain cultures like running of the bulls, Cinco de Mayo, lantern festival, Chinese new year, etc.), religious or cultural holidays and events, etc.

These reasons for the particular user liking an asset are typically not globally consistent for all users. For example, relatives of one user may not be the same for another user. In another example, a certain place that one user has visited, and photos of that place, may be totally irrelevant to a second user or may even evoke a negative reaction if the second user has had a bad experience at that place. Therefore, these reasons for the particular user liking an asset are semantically-based, e.g., why the user likes the asset is based on a meaning of subject(s) in the asset to the user, not necessarily on how the subject(s) are portrayed in the asset.

Based on the above discussions, there may be two ways of estimating whether a particular user may like a particular asset: an aesthetic appeal and a semantic appeal. An embodiment for determining an aesthetic appeal is described later. One embodiment of determining a semantic appeal is described below.

Figure 3:
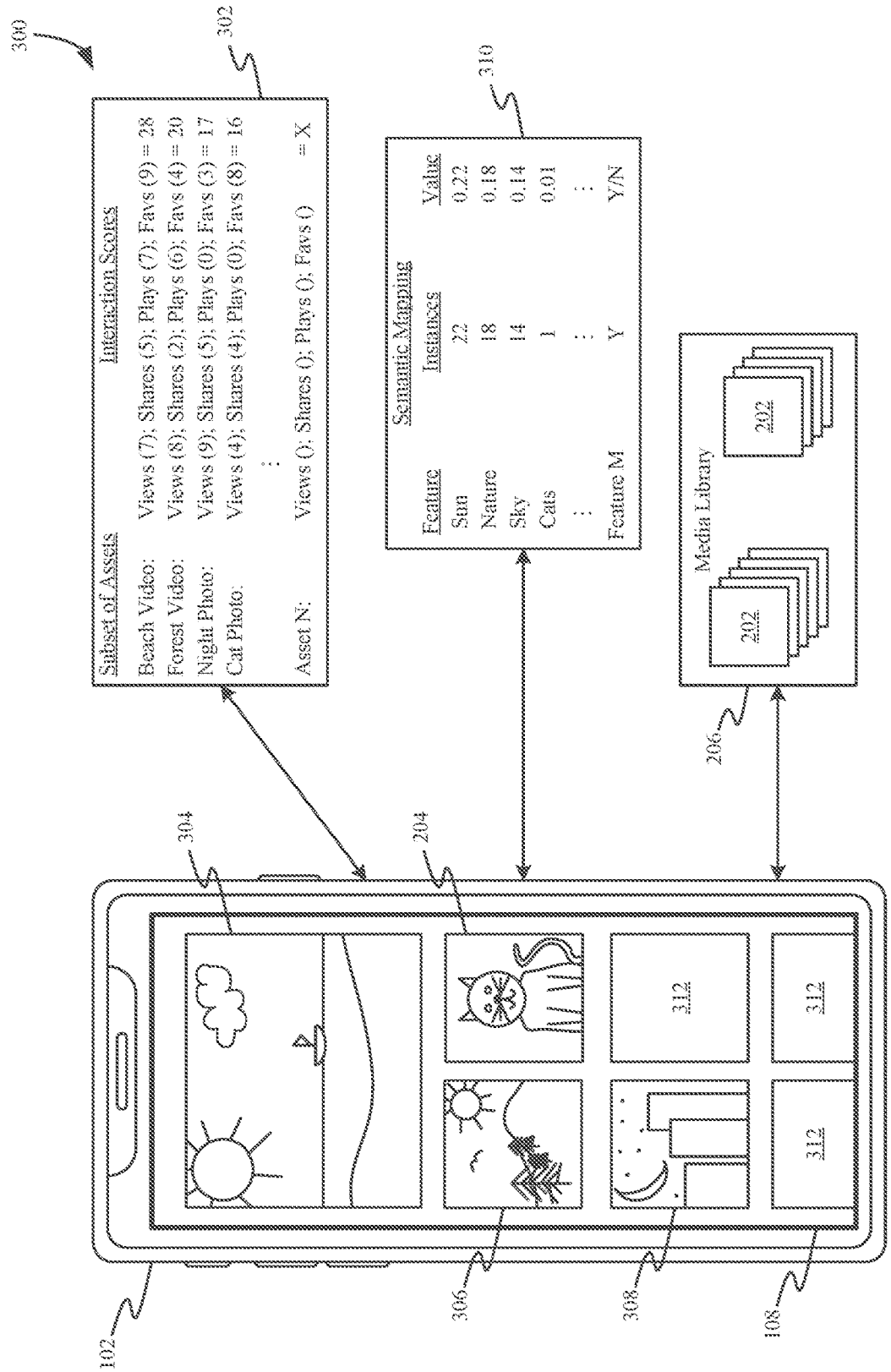
FIG. 3 shows an example system for creating a semantic mapping to predict that a particular user will enjoy viewing particular assets of a media library.

FIG. 3 shows an example system 300 for creating a semantic mapping 310 to predict that a particular user will enjoy viewing particular assets of a media library 206. Semantic mapping 310 may include objects, scenes, and/or people that have been identified from a subset of assets 302 of media library 206 that appear in a certain percentage of assets from the subset of assets 302. This certain percentage may be predetermined and static, or dynamic to allow for adjustment to ensure a robust data set is represented in the semantic mapping that includes at least a certain number of identified features, e.g., 10, 25, 50, 100, 200, 500, etc.

In one approach, the subset of assets 302 may be determined based on which assets achieved highest interaction scores as described previously. When this method is utilized, the subset of assets 302 may be referred to as a "gold set." In another approach, the subset of assets 302 may be randomly chosen from amongst all assets 202 of media library 206. In an approach, assets included in the subset of assets may be chosen based on which assets have been most recently interacted with by the user. Other ways of determining how many and which assets to include in the subset of assets 302 may be used as would be understood by one of skill in the art upon reading the present descriptions.

If a certain object, scene, and/or person cannot be identified from one or more assets, then it probably cannot be used to determine semantic appeal for the object in other assets. Therefore, image analysis is performed on the subset of assets 302 to identify objects, scenes, and/or people that appear in the assets. Any type of known image analysis that may identify features of the assets may be used to extract the various objects, scenes, and/or people represented in the subset of assets 302.

Some example objects that may be identified in the subset of assets 302 include, but are not limited to, furniture, toys, food, sporting equipment, tools, books, architectural elements (e.g., doors, windows, houses, buildings, columns, etc.), vehicles, heavenly and planetary bodies (e.g., the sun, clouds, rain, snow, Earth, stars, comets, etc.), natural elements (e.g., trees, grass, flowers, plants, waterfalls, waves, etc.), etc.

Some example scenes and locations that may be identified in the subset of assets 302 include, but are not limited to, beach, forest, ocean and sea, rivers, cityscapes, concert and performance venues, interiors, professional and amateur sporting venues, business or office, home, etc.

Some example people that may be identified in the subset of assets 302 include, but are not limited to, family members, friends, co-workers and colleagues, famous people, celebrities, politicians, mentors, historically-significant people, loved ones who have deceased, etc.

To aid in understanding the semantic mapping 310, some of the assets from the subset of assets 302 which achieved highest interaction scores for all assets 202 of media library 206 are shown on smartphone 102 in media-viewing application 108, along with other assets 312 not specifically discussed. In this example, asset 304 (e.g., beach video) has an interaction score of 28, asset 306 (e.g., forest video) has an interaction score of 20, asset 308 (e.g., night photo) has an interaction score of 17, and asset 204 (e.g., cat photo) has an interaction score of 16. These interaction scores are a summation of all views, shares, plays, and favorites tracked for each of these assets, e.g., over a certain recent period of time. The recent period of time may span any amount of time, such as a day, a week, a month, a year, five years, since creation of the media library, etc.

Based on the high interaction scores that are calculated from numerous times and types of interactions that the user had with the assets, the media-viewing application 108 may determine that the user likes each and every asset in the subset of assets 302, when interaction scores are used to determine which assets to include in the subset of assets 302. However, there is still no cohesive understanding of why the user likes these particular assets more than other assets in media library 206. In order to determine what aspects of these assets appeal to the user, semantic mapping 310 is generated to predict and assign significance and meaning that these assets have for the user in a quantitative manner.

In one approach, features most commonly appearing in the subset of assets 302 are counted to generate the semantic mapping 310. For example, the semantic mapping 310 shows that "sun" is a feature of 22 different assets (e.g., included in beach video 304 and forest video 306) in the subset of assets, "nature" is a feature in 18 different assets (e.g., included in beach video 304 and forest video 306), "sky" is a feature of 14 different assets (e.g., included in beach video 304, night photo 308, and forest video 306), and "cats" is a feature of just 1 asset (e.g., included in cat photo 204). Based on organizing the results of which features appear most commonly in the subset of assets 302, a portrayal of which features are most likely to evoke semantic appeal with the user (appeal for the user based on meaning rather than aesthetics) will emerge through the semantic mapping 310.

For example, "sun" is represented in 22 assets, while "cats" is represented in only 1 asset. There is a strong indication that the user does not prefer images of cats, while actually preferring images of the sun. In order to quantitatively represent this tendency of the user to prefer the sun in assets about 22 times more than cats, semantic scores may be calculated for each asset 202 of media library 206 based on semantic mapping 310.

In another approach, a value assigned to a feature for calculating semantic scores may be based on individual interaction scores for the assets which included the respective feature. For example, for feature "Cats," the interaction score of the sole asset which included this feature is 16. Therefore, the semantic value assigned to "cats" feature for calculating semantic scores of other assets may be based on 16, such as a normalized value, e.g., 0.16. When a feature is included in more than one asset, the interaction scores for all the assets may be added together to form the semantic value of that feature. In this way, the semantic value of a feature is based on interaction scores of assets in the subset of assets 302 rather than simply being based on quantity of assets which include the feature. This provides for a feature that is included in assets that are most interacted with will increase a semantic score more than a feature which may be included in more assets by quantity, but those assets are interacted with less by the user in general.

The semantic score calculated using the technique described previously may be normalized using the number of assets that include the feature. For example, if a user interacts a lot with photos of cats, but the user only has a few pictures of cats in the media library, more emphasis (weighting) may be placed on the feature "Cats" than would be placed on a feature for "Dogs" if the user interacts the same amount with photos of dogs, but the user has lots of pictures of dogs in the media library. Moreover, because discovery of hard-to-find assets is one benefit of the techniques described herein, with less cat pictures, they will be harder to find in the media library than the more plentiful dog pictures. This is another reason to increase the interaction value assigned to the feature "Cats" more than that for "Dogs."

In one example, if an asset which depicts a "Cat" has been interacted with by the user 1000 times, and another asset which depicts a "Dog" has been interacted with by the user 100 times, and both assets are included in the subset of assets 302, in this example, the semantic mapping 310 may indicate that a semantic score assigned to an asset that depicts a "Cat" would be much greater (e.g., twice as much, five times as much, ten times as much) than a semantic score assigned to an asset that depicts a "Dog."

Once the counts or instances are established, some, all, or a certain percentage of most common features may be determined, and values may be assigned to these features for use in creating semantic scores for assets in media library 206.

To calculate individual semantic scores for each asset 202, respective values may be associated to some or all features in semantic mapping 310. Then, when analyzing a particular asset, for each feature that is identified in the particular asset, corresponding values for the identified features may be summed together to form the semantic score of the particular asset. If a feature, such as "cats," is not well represented in the subset of assets 302, it may be ignored when calculating semantic scores for other assets in one approach.

In an approach, a feature may be considered in semantic score calculations in response to a threshold percentage of assets including the feature, e.g., 5%, 10%, etc.; otherwise, the feature may be ignored in semantic score calculations.

In an example, for a photo that includes a cat lounging in bright sunlight backlit by the sun, a semantic score of 1+22=23 may be calculated, 1 for cat, and 22 for sun. Another video showing a landscape of tall trees swaying in the breeze backdropped by a gorgeous sunset may have a semantic score of 18+14+22=54, 18 for nature, 14 for sky, and 22 for sun. The semantic score of 23 for the cat lounging photo and 54 for the video of swaying trees may be compared with one or more other calculated semantic scores for other assets to determine which assets that are most likely to be preferred by the user, in an approach. In this example, the video of swaying trees may be determined to be more preferred by the user than the cat lounging photo.

In another example, values for each feature may be normalized, e.g., based on a total number of assets analyzed for the features. Assuming that N=100 indicating that there are 100 total assets in the subset of assets 302, "sun" is represented in 22% or 0.22 of the assets, "nature" is represented in 18% or 0.18 of the assets, "sky" is represented in 14% or 0.14 of the assets, and "cats" is represented in 1% or 0.01 of the assets. In other words, for any feature M which appears in Y different assets of the subset of assets 302 analyzed, the normalized value may be equal to Y/N. These normalized values may then be used to calculate semantic scores for any asset 202 of the media library that is determined to have the corresponding features represented therein.

With the semantic mapping 310 being generated, the plurality of assets 202 of the media library 206 may be analyzed using the semantic mapping 310 to generate a plurality of semantic scores. Each asset 202 of the media library 206 may be assigned a semantic score that represents and predicts, based on the semantic mapping 310, how meaningful the asset is for the user.

In an approach, the values calculated for each feature in semantic mapping 310 may be used to determine which of the assets 202 in the media library 206 share certain identified features and calculate a semantic score for each asset 202 based on semantic mapping 310 using any of the techniques described above. These semantic scores may predict which of the assets 202 will most likely also be preferred by the user in addition to those calculated from the subset of assets 302.

The generation of semantic mapping may be performed periodically, such as weekly, monthly, or in response to certain triggers or conditions. The calculation of semantic scores for individual assets may take place periodically, such as daily, weekly, or monthly, or in response to new asset(s) being stored to media library 206 and/or asset(s) being removed from media library 206. Moreover, these calculations may be performed during non-peak usage times, such as during times that a user typically is sleeping (e.g., at night), while a user device is plugged in and not in use, etc.

In an example, interacting with assets may also trigger a recalculation of interaction scores, because additional interactions change the semantic mapping 310 and aesthetics preferences for a user. Therefore, a recalculation may be triggered in response to: 1) a certain change in the subset of assets used to determine the semantic mapping 310, 2) a total number of interactions changing for a certain percentage of the subset of assets 302, 3) additional assets being added to the subset of assets 302 (assuming a certain amount of interaction defines whether an asset should belong to the subset of assets 302), etc.

In one approach, a plurality of personal aesthetic scores may be generated. Some or all of the assets 202 in media library 206 may have a respective personal aesthetic score generated and correlated to the asset. The personal aesthetic scores are configured to capture how aesthetically pleasing a particular asset is (whether it is an image, video, animated image, etc.) when compared to what is considered to be aesthetically pleasing to most people (e.g., a global aesthetic).

The global aesthetic describes a highest aesthetic score (e.g., 1.0) possible using an algorithm or set of algorithms that attempt to determine whether visual aspects and cues in an asset, e.g., lighting, contrast, positioning of elements, numbering of elements, etc., are visually pleasing to a user. The global aesthetic represents an optimally-aesthetically pleasing image or series of images (in the case of a video) as determined by experts in the field. The global aesthetic may be compared to individual aesthetic scores calculated for individual assets to determine how far from the global standard the particular assets rate, e.g., a deviation from the global aesthetic. In another approach, an aesthetic score for a highest rated asset in media library 206 may be used to normalize all other assets 202 in media library 206 to provide for personal aesthetic scores for the assets 202. An aesthetic score is calculated for each of the assets 202 individually using the same algorithm or set of algorithms used to determine the global aesthetic. Then, a determination is made as to a difference between the global aesthetic and the individual aesthetic for each asset, or personal aesthetic scores are calculated based on a normalized approach for the entire media library 206.

In one approach, only assets which achieve a personal aesthetic score meeting a certain threshold (e.g., 0.25, 0.4, 0.5, etc., out of 1.0) may be considered for further processing, while unaesthetically pleasing assets may be dropped from consideration. In a different approach, personal aesthetic scores may be used in a weighted overall analysis of the particular asset in conjunction with a corresponding semantic score.

The weighted overall analysis may assign a certain weight to the semantic score and a certain weight to the aesthetic score, then weight-average the scores together to achieve a weighted semantic/aesthetic score for the particular asset. Any way of determining specific weights for the scores may be used, as would be known to one of skill in the art.

Beside semantic score and personal aesthetic score, the interaction score of a particular asset may be utilized in a calculation for an overall analysis that the user will want to see the particular asset. Note that the subset of assets 302 is subject to analysis and eventually aids in selection of assets for presentation to the user.

In addition, in an example, a global semantic score may be added to a calculation for an overall analysis that the user will want to see the particular asset. For example, assets obtained or captured during trips, landmarks, weddings, concerts, etc., may have a global semantic score assigned regardless of whether the user has interacted with those assets because they include certain features known to be favored by the user. This allows new assets recently added to the media library 206 to be analyzed even if they have not been interacted with.

Once a first tier of top rated or best assets are determined from media library 206, these first tier assets may be used by other applications, programs, modules, etc., and prominently displayed to a user interface when viewing assets of the media library 206 instead of simply showing a portion of all assets 202 of media library 206.

In an example, overly present features may be excluded from semantic score calculations. For example, if a majority of assets in the first tier include a common feature, such as "mother," "sky," or "nature," or some other fairly general feature, this feature may be excluded from the semantic mapping, and a second round of semantic score calculations may be performed to remove the influence of this particular feature that may be skewing the ratings of the assets.

Moreover, diversity may be introduced into the first tier assets by detecting overly present features and lessening the impact that inclusion of this feature has on an asset achieving a high semantic score. When less images include the particular feature, more diversity of features may be included in the first tier assets. In another example, exact duplicate assets and assets which are substantially similar (e.g., similar in time of capture and content) but not necessarily exact duplicates may be removed from consideration in calculating semantic scores. In this way, duplicate and almost duplicate assets will not be present in the first tier. However, the presence of duplicate and substantially similar assets may indicate that a user is greatly interested in the subject of these assets, and semantic, interaction, and/or personal aesthetic scores may be adjusted to reflect this increased interest.

Another method may be used, referred to as dropout, where the number of features included in the semantic mapping is flattened, and then features may be randomly removed from the list. Features which appear more frequently in the subset of assets 302 will most likely be randomly chosen to be removed. For example, if there are 700 sunsets and 150 cats, it is most likely that sunsets will be removed instead of cats. After flattening the semantic mapping 310, semantic scores may be re-calculated. This results in a type of equalization, which may prevent overfitting of the model used.

In an example, another method to achieve diversity may include calculating a number of assets included in clusters of assets that have the same features (e.g., sun, cat, and beach). It is noted that assets from smaller cluster sizes should be given priority over assets from larger clusters, and therefore this preference may be reflected by assigning higher semantic scores to the assets from smaller clusters. For example, given five clusters with respective numbers of assets of 10, 8, 7, 5, and 2, and a restriction that only ten photos out of this total of 32 assets are sought for display, in one approach, two assets could be chosen from each of the five clusters. This would be preferred to selecting ten assets from the first cluster. This method allows for more control over how assets are selected versus dropout; however, this process is also more computationally rigorous.

For example, if a user takes a series of photos of a sunset over a beach to capture one great shot, and "sun," "beach," "waves," and "landscape" all have high semantic values, then it is probable that all of the series of photos would be included in the first tier, which would be undesirable from a practical point of view, because the user would not want to see all of the beach sunset photos, only the best one. Therefore, the asset which achieves the highest semantic score and/or personal aesthetic score out of a set of duplicate and substantially similar assets will be included for consideration for selection.

In one approach, first tier assets from media library 206 may be those assets which rate within a first percentage of all assets 202 for semantic score, personal aesthetic score, or both. The first percentage may be user-specific or automatically generated, and may depend on a number of assets in media library 206 to ensure too many or too few assets are not presented for display as first tier assets, e.g., 10%, 8%, 5%, 2%, 1%, etc. Moreover, the first percentage may be adjustable in an example.

The overall analysis, in various approaches, may utilize any linear or non-linear function of the interaction score, semantic score, global semantic score, personal aesthetic score, and/or global aesthetic score, alone or in combination with other factors.

In other approaches, a set number of assets may be included in the first tier and/or a number of assets which achieve a predetermined threshold semantic score (e.g., 0.4, 0.5, 0.6, 0.75, 0.8, 0.9, etc., out of 1.0) may be included in the first tier of assets.

According to a further example, a second tier of highly rated assets from media library 206 may be determined that do not score as highly as the first tier assets. This second tier may include assets that rate within the first percentage of all assets 202 for semantic score or personal aesthetic score, but not both. In addition, these second tier assets may rate within a second percentage for both semantic score and personal aesthetic score, in a preferred approach, or within the second percentage for only one of semantic score and personal aesthetic score in another approach. The first percentage is less than the second percentage, thereby making it more difficult for an asset to rate within the first percentage and be considered first tier.

Once second tier assets are determined, in response to a determination that no first tier assets correspond to a current view of the user interface (which may be based on guidance, as described below), one or more of the second tier assets may be used in the current view by an application, program, module, etc., and prominently displayed to a user interface when viewing assets of the media library 206.

The second percentage may be a user-specific, automatically generated, and/or adjustable percentage greater than the first percentage, such as 25%, 20%, 15%, 12%, 10%, etc. Either of the first percentage and the second percentage may be adjusted to ensure that more or less assets qualify in the first tier and second tier groupings, for use in the media library 206 and other applications, programs, modules, etc., that have access to assets from media library 206.

In other approaches, a set number of assets may be included in the second tier and/or a number of assets which achieve a predetermined threshold semantic and personal aesthetic score (e.g., 0.4, 0.5, 0.6, 0.75, 0.8, 0.9, etc., out of 1.0) may be included in the second tier of assets.

In a further approach, some guidance may be provided by the application seeking assets to display prior to determining the subset of assets to base the semantic mapping on. In another approach, the guidance may be used to determine which assets are the top rated or best assets. For example, this guidance may include a date, date range, a theme and/or mood for the assets to adhere to, etc. In response to receiving this guidance, features from semantic mapping 310 which best exemplify this date, date range, theme, and/or mood may be weighted higher than other features when calculating semantic scores for assets 202 of media library 206. This enables assets which best adhere to the guidance to have higher semantic scores relative to other assets which do not adhere to the guidance as closely.

For example, if the guidance indicates a theme of "Christmas," then some selected features to emphasize in calculating semantic scores may include snow, Christmas or conifer trees, Santa Claus, presents and gifts, etc. Based on weighting these features higher (by assigning the features higher semantic values), the top rated or best assets would most likely include images of these desired features more often than other assets. In a further approach, features which do not exemplify Christmas may be de-emphasized and weighted less by reducing their respective semantic values. Some examples of features which may have reduced semantic values to exclude them from a theme of "Christmas" include sun, beach, other holidays (e.g., $4^{th}$ of July, Halloween, etc.), swimming, baseball, etc.

In another example, if the guidance indicates a mood of "Nostalgia," then some selected features to emphasize in calculating semantic scores may include older family members, major events that happened in the past (e.g., births, weddings, graduations, etc.), images of deceased persons of significance to the user, older images based on timestamps, etc.

Any theme or mood that is capable of being converted into weighting for semantic score calculations may be used as guidance, such as certain feelings (e.g., happy, sad, mellow, exciting, etc.), holidays, trips, events, people, etc. The process of applying these themes or moods to alter semantic scores of the assets may vary depending on the specific user, size of the media library, type of asset (photo versus video), etc.

Figure 4:
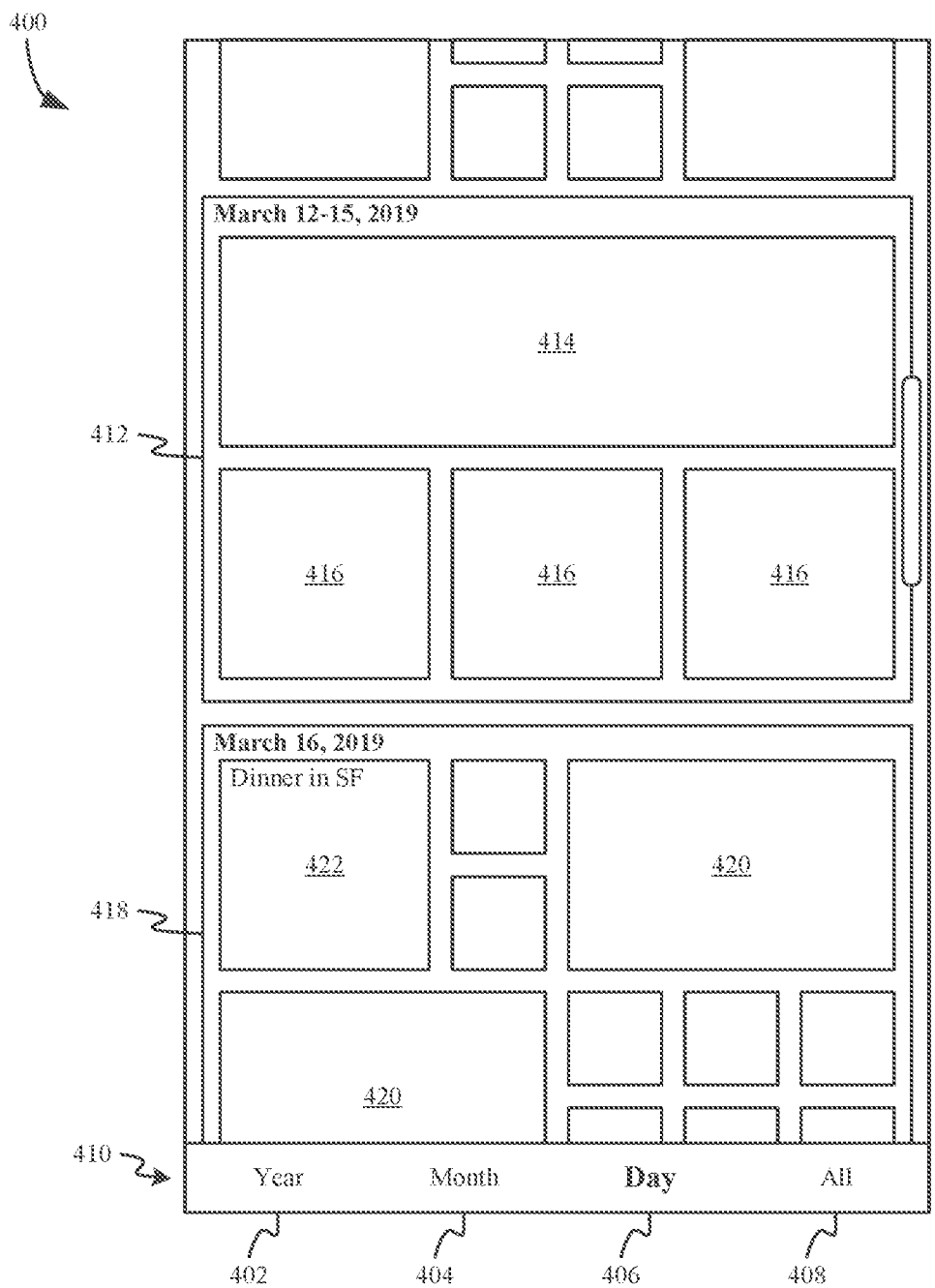
FIG. 4 shows an example day view of a media library application.

FIG. 4 shows an example day view 400 of a media library application. The media library application is an example of an application, module, software, etc., that may utilize assets from the media library. In day view 400, an aggregation card 412 and a day card 418 are shown as examples. The day view 400 may be used to display some or all assets associated with multiple consecutive days (e.g., Mar. 12-15, 2019). Day view 400 also includes a navigation ribbon 410 for switching between views of the media library application, including as an example, year view 402, month view 404, day view 406, and all assets view 408. Day view 406 is highlighted since it is the current view.

In one approach, day view 400 may display curated assets 416 on aggregation card 412 in response to a determination that there are not enough assets from any of the individual days of the aggregation period (e.g., March 12-15) to display the days on separate day cards. In other words, the media library application may determine a number of curated assets for each day, compare the number of curated assets for each day with a predetermined day card threshold (e.g., two, three, four, five curated assets, etc.), and determine whether one or more of the particular days should be represented with its own day card, or aggregated together with other adjacent days (previous day or subsequent day) to form an aggregation card to represent assets during the aggregation period.

Key asset 414 is shown prominently to aggregation card 412 based on a determination that a user will prefer this asset over other assets available for display within the aggregation period. The determination of key asset 414 may be based, in one embodiment, on interaction scores, semantic scores, global semantic scores, personal aesthetic scores, and/or global aesthetic scores, for assets available for display within the aggregation period.

Similarly, day card 418 presents key assets 420 prominently and key asset 422 less prominently. In one example, key assets 420 may be determined to be first tier assets based on semantic scores and/or personal aesthetic scores, while key asset 422 may be determined to be a second tier asset based on semantic score and/or personal aesthetic score.

Figure 5:
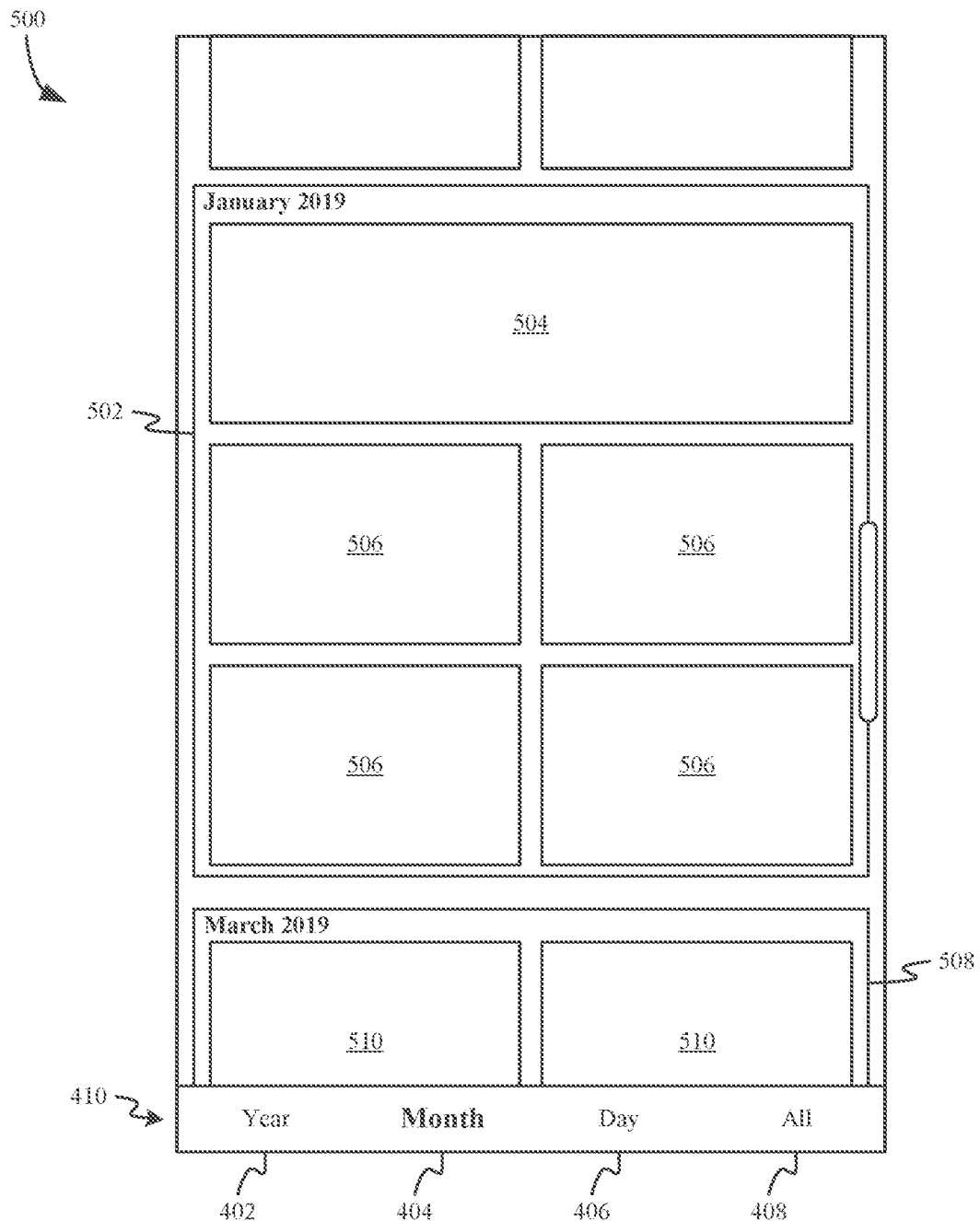
FIG. 5 shows an example month view for the media library application.

FIG. 5 shows an example month view 500 for the media library application. Month view 404 is highlighted since it is the current view. This view 500 may be used to display key assets 504, 506 associated with a particular month (e.g., January 2019) on month card 502. Key asset 504 may have a higher semantic score and/or personal aesthetic score than key assets 506 in one example, which leads to it being displayed more prominently than key assets 506. All of key assets 504, 506 are assets from the media library associated with the particular month that are determined to be the best assets to represent the month (e.g., most likely to be important, desirable, memorable, aesthetically pleasing, etc.) based on higher semantic scores and/or personal aesthetic scores in one approach.

Key assets may be selected from curated assets based on semantic scores and/or personal aesthetic scores of the various curated assets. A curated asset which attains a highest interaction score, semantic score, global semantic score, personal aesthetic score, and/or global aesthetic score for a particular week in a month may be selected as the key asset to represent that week, in one approach.

In one approach, each time month card 502 is shown, another set of key assets may be selected and displayed from amongst all first and/or second tier assets determined for January 2019. In this way, month card 502 may dynamically change each time it is shown, but still display only key assets for the month represented which are most likely to be the best assets taken from the month.

Key assets 510 are also shown in month view 500 that relate to a particular month (e.g., March 2019) on month card 508. These key assets 510 may have similar semantic and/or personal aesthetic scores, and therefore are shown with equal prominence to the display.

Figure 6:
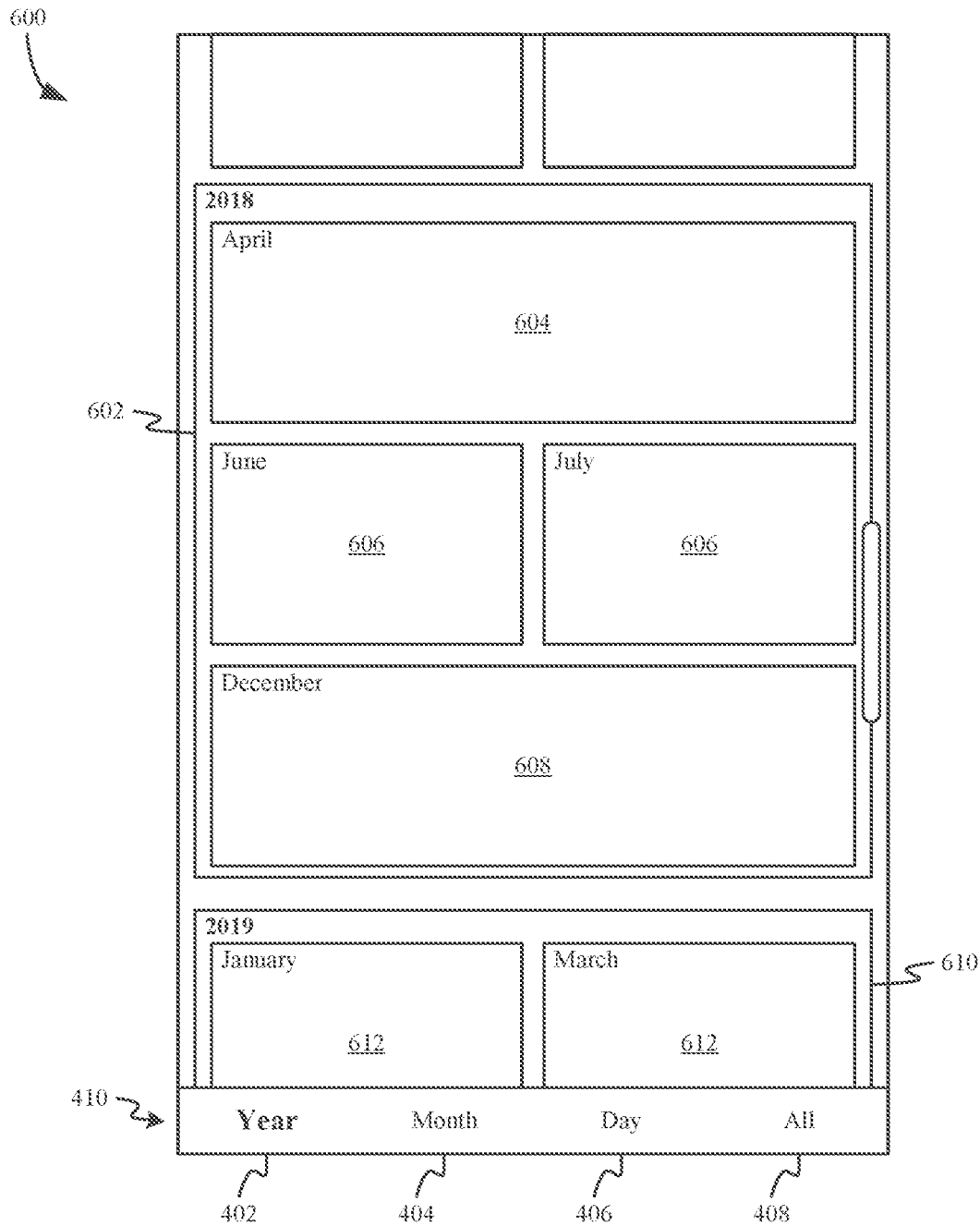
FIG. 6 shows an example year view for the media library application.

FIG. 6 shows an example year view 600 for the media library application. Year view 402 is highlighted since it is the current view. This view 600 may be used to display one or more key assets 604, 606, 608 associated with the particular year (e.g., 2018) on year card 602. In one approach, one or more particular months (e.g., April, June, July, December) of a particular year (2018 for example) may have key assets 604, 606, 608 displayed for year card 602.

Key assets 604 and 608 may have higher semantic scores and/or personal aesthetic scores than key asset 606 in one example, which leads to key assets 604, 608 being displayed more prominently than key asset 606. All of key assets 604, 606, 608 are assets from the media library associated with the year that are determined to be the best assets to represent the year, and the individual months from that year (e.g., most likely to be important, desirable, memorable, aesthetically pleasing, etc.) based on higher semantic scores and/or personal aesthetic scores in one approach.

Key assets may be selected from curated assets based on semantic scores and/or personal aesthetic scores of the various curated assets. A curated asset which attains a highest interaction score, semantic score, global semantic score, personal aesthetic score, and/or global aesthetic score for a particular month in a year may be selected as the key asset to represent that month on year view 600, in one approach.

Year card 602 may include other years (e.g., 2019) on another year card 610, with key assets 612 for months of that year (e.g., January, March) being prominently displayed on year card 610.

In one approach, contextual behavior may be used as a factor in determining assets to display for any of the previously described views: day, aggregation, month, and year. For example, if today is October 31, then a theme may be "Halloween" and assets that rate highly for semantic scores related to Halloween may be selected for display, as previously described.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 7:
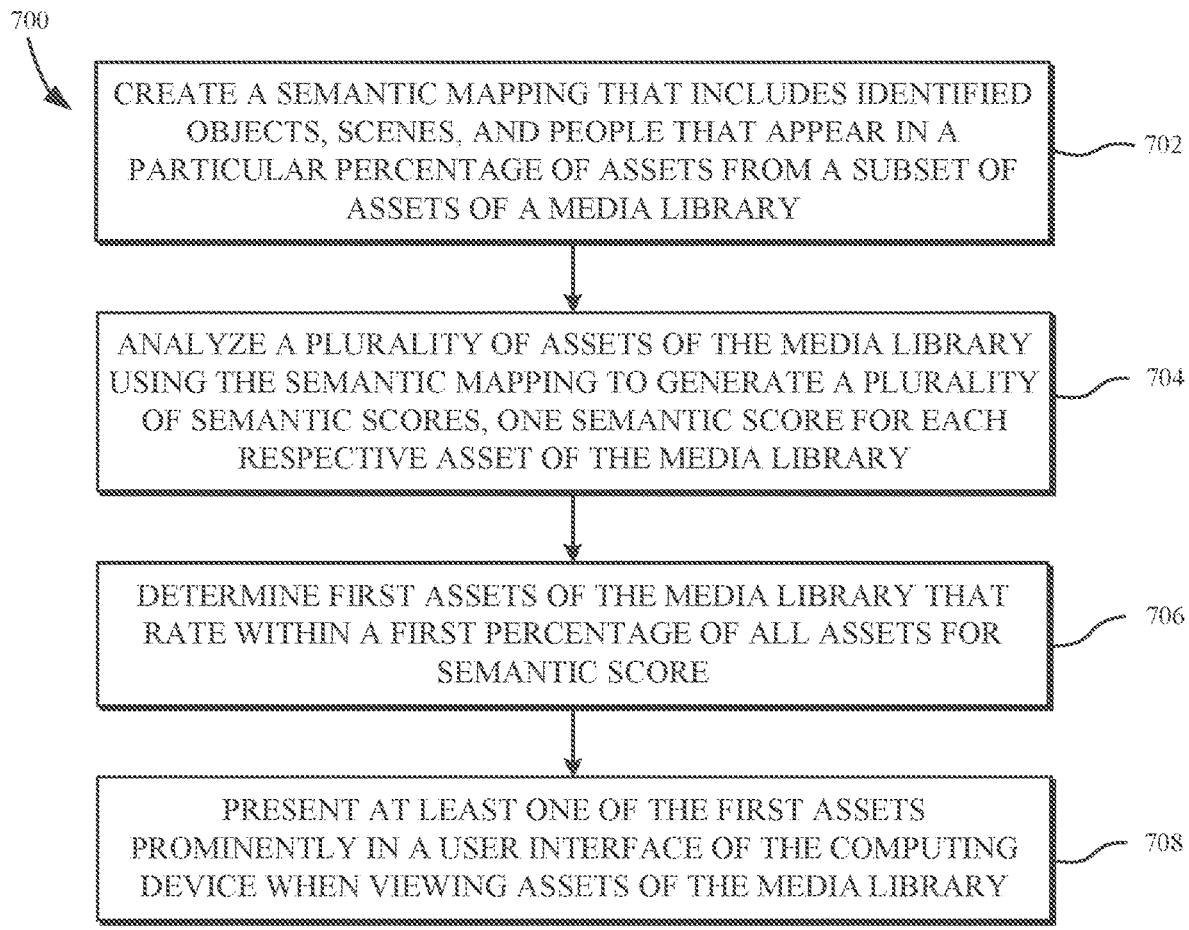
FIG. 7 is a flow diagram of an example method for determining meaning for assets of a media library.

FIG. 7 is flow diagram of an example method 700 for determining meaning for assets of a media library. Assets which are determined using method 700 to have greater meaning to a user may be used as key assets for display in any of the example views described in FIGS. 4-6, or others not specifically described herein.

Referring again to FIG. 7, in operation 702, a computing device may create a semantic mapping. The semantic mapping includes features identified from a subset of assets of a media library that appear in a particular percentage or threshold number of assets from the subset of assets (e.g., identified objects, scenes, and people in an example). The particular percentage or threshold number of assets may be predetermined and static, or dynamic to ensure a robust data set in the semantic mapping, e.g., a threshold number of features (e.g., 10, 25, 50, 100, 200, 500, etc.) to be included in the semantic mapping. In some approaches, the particular percentage may be in a range from about 50% to about 5%, such as 10%. In one approach, the particular threshold may be based on the total number of assets in the subset of assets. In another approach, a predetermined number of features (e.g., 10, 25, 50, 100, 200, etc.) which appear the most in the subset of assets may be included in the semantic mapping.

The computing device may be any device capable of processing and analyzing images in the media library, such as a mobile telephone, laptop computer, desktop computer, server, etc.

Figure 8:
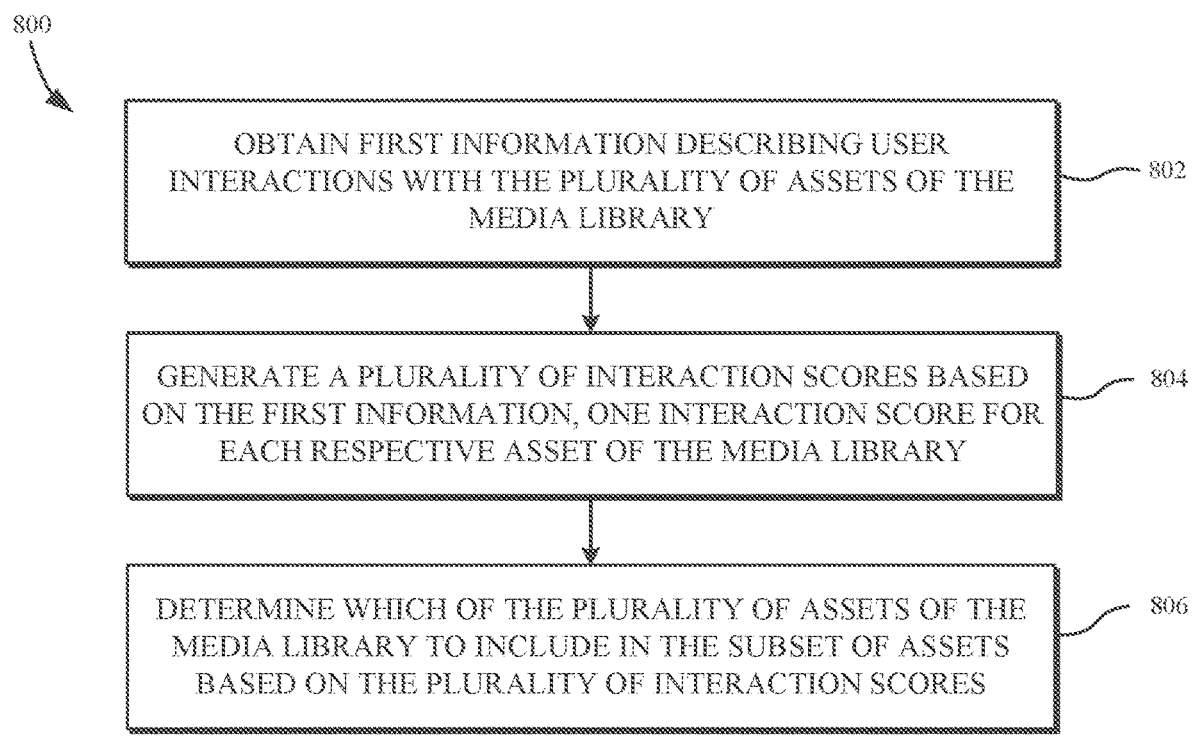
FIG. 8 is a flow diagram of an example method for determining a subset of assets of a media library to use for semantic mapping.

In one approach, the subset of assets selected from the media library may be determined as described in FIG. 8 or using some other method described herein or known in the art for selecting a subset of assets which may provide information about which assets have meaning to a particular user.

With reference again to FIG. 7, in operation 704, the computing device may analyze one or more assets of the media library using the semantic mapping to generate a plurality of semantic scores. The number of assets analyzed may include some or all of the media library, depending on what type or kind of assets or how many assets are desired to be examined. One semantic score is generated for each respective asset of the media library. The analysis may be performed in accordance with previous descriptions.

In an example, a semantic score for a respective asset may be determined based on a quantity of the identified objects, scenes, and people that appear in the respective asset. In one approach, semantic scores may be normalized in one of several ways, described herein or known in the art.

In a further example, a specific feature may be emphasized or de-emphasized in calculating semantic scores by weighting a corresponding semantic value associated with the specific feature more or less.

In one example, if an asset which depicts a "Cat" has been interacted with by a user 1000 times, and another asset which depicts a "Dog" has been interacted with by a user 100 times, and both assets are included in the subset of assets, in this example, the semantic mapping may indicate that a semantic score assigned to an asset that depicts a "Cat" would be much greater (e.g., twice as much, five times as much, ten times as much) than a semantic score assigned to an asset that depicts a "Dog."

In other examples, the interactions that the user has with assets in the subset of assets may not be used, or may have less of an effect, in calculating the semantic scores to assign to assets analyzed using the semantic mapping. The analysis of the assets results in individual semantic scores being assigned to at least some of the assets of the media library.

In operation 706, the computing device may determine an identity of first assets of the media library that rate within a first percentage of all assets for at least semantic score, referred to as first tier assets in some descriptions.

In an example, the first percentage may include a percentage in a range from about 1% to about 10% of all assets, such as about 5% of all assets.

In operation 708, the computing device may present at least one of the first assets prominently in a user interface of the computing device when viewing assets of the media library. The user interface may be similar to any of the example views shown in FIGS. 4-6, or others not specifically described herein, such as social media interfaces, camera interfaces, video and photo collage compositing interfaces, etc.

FIG. 8 is flow diagram of an example method 800 for determining a subset of assets of a media library to use for semantic mapping. In operation 802, a computing device may obtain first information describing user interactions with a plurality of assets of a media library. The first information may be gathered, received, tracked, or otherwise provided to the computing device, either directly or indirectly. In an example, user interactions may include any access, view, play, share, like, favorite, transfer, or other way of indicating that a user has manipulated or connected with a particular asset.

In an example, the interaction scores may be based on, for each respective asset in the media library, a number of times the respective asset is viewed, a number of times the respective asset is played, whether each respective asset has been marked as a favorite, a number of times the respective asset is shared with one or more other people, etc. Some or all of these interactions, alone or in conjunction with other types of interactions, may be considered when calculating the interaction scores.

In addition, in an example, sharing the respective asset alone or with a smaller group of other assets increases a corresponding interaction score more than sharing the respective asset with a larger group of other assets. For example, sharing a photo by itself is more indicative of the user preferring that image over others than is automatically sharing a set of photos and videos taken on a trip recently when the user returns home. The first action indicates thought by the user in selecting the particular photo to share, whereas the latter action may be performed almost perfunctorily without much thought at all.

In accordance with one approach, the respective asset may be determined to be viewed in response to the respective asset being shown on the user interface of the computing device for a predetermined amount of time, e.g., 1 second, 2 seconds, 5 seconds, 8 seconds, etc. In another approach, a user action (such as hovering over the asset with a cursor, selecting the asset, etc.) may be used to determine when the asset has been viewed.

In operation 804, the computing device may generate a plurality of interaction scores based on the first information. An individual interaction score is generated for each respective asset of the media library. The interaction scores may be calculated in accordance with examples previously described, or according to another method as would be known in the art.

In operation 806, the computing device may determine which of the plurality of assets of the media library make up the subset of assets. This determination may be based on the interaction scores calculated in operation 804. For example, assets which have the highest interaction scores may be included in the subset of assets.

According to one approach, the first information may describe user interactions with the plurality of assets of the media library that have occurred over a most recent period of time. The period of time that is used for collection of the first information may be user selected or automatically determined to provide a snapshot of recent activity by the user, such as the last year, last 6 months, last 3 months, last 6 weeks, last month, last 2 weeks, etc.

In an example, personal aesthetic scores may be generated for some or all assets of the media library. One personal aesthetic score is generated for each respective asset of the media library. The personal aesthetic scores may be generated according to examples described herein, based on a global aesthetic, and/or in accordance with any other known method of generating individual determinations of how visually pleasing or interesting assets of the media library would be to a particular user.

In one approach, the first assets of the media library may rate within the first percentage of all assets for semantic score and personal aesthetic score when personal aesthetic scores are utilized.

In another approach, the computing device may determine second assets of the media library that rate within the first percentage of all assets for semantic score or personal aesthetic score (but not both) and rate within a second percentage for semantic score and personal aesthetic score. After determining the second assets of the media library that rate slightly lower than the first assets, these second assets may be used when first assets are not available. For example, in response to a determination that no first assets correspond to a current view of the user interface, the computing device may present at least one of the second assets prominently in the user interface of the computing device.

In a specific example, the first percentage may include a range of all assets in the media library from about 1% to about 10%, such as 5% of all assets, and the second percentage may include a range of all assets in the media library from about 5% to about 25%, such as 15% of all assets. In this example, the second percentage is greater than the first percentage, e.g., first percentage<second percentage.

Figure 9:
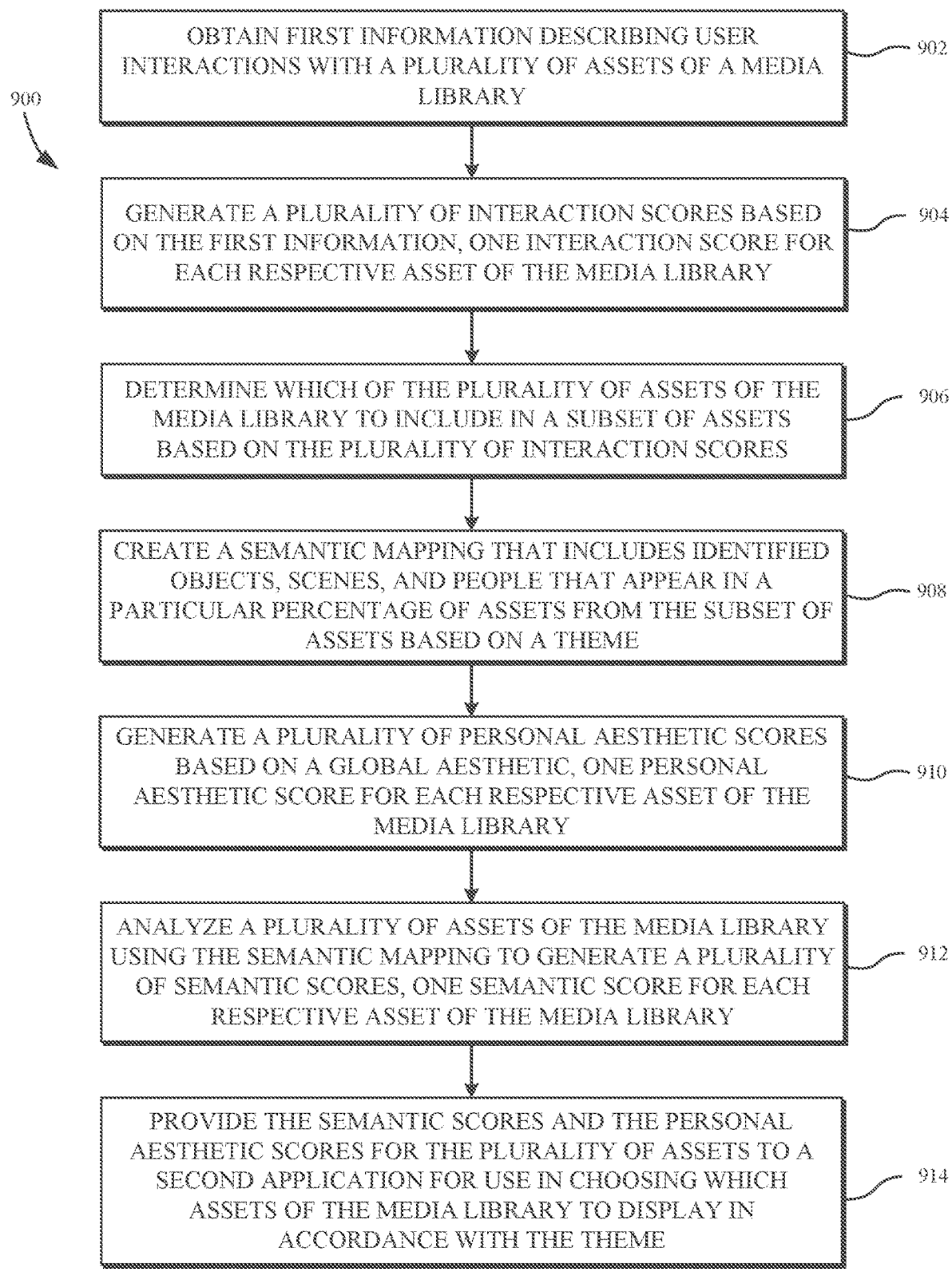
FIG. 9 is a flow diagram of an example method for determining best assets to display according to a theme.

FIG. 9 is a flow diagram of an example method 900 for determining best assets to display according to a theme. In operation 902, a computing device may obtain first information describing user interactions with a plurality of assets of a media library. The first information may be gathered, received, tracked, or otherwise provided to the computing device, either directly or indirectly. In an example, user interactions may include any access, view, play, share, like, favorite, transfer, or other way of indicating that a user has manipulated or connected with a particular asset.

The computing device may be any device capable of processing and analyzing images in the media library, such as a mobile telephone, laptop computer, desktop computer, server, etc.

In an example, the interaction scores may be based on, for each respective asset in the media library, a number of times the respective asset is viewed, a number of times the respective asset is played, whether each respective asset has been marked as a favorite, a number of times the respective asset is shared with one or more other people, etc. Some or all of these interactions, alone or in conjunction with other types of interactions, may be considered when calculating the interaction scores.

In operation 904, the computing device may generate a plurality of interaction scores based on the first information. An individual interaction score is generated for each respective asset of the media library. The interaction scores may be calculated in accordance with examples previously described, or according to another method as would be known in the art.

In operation 906, the computing device may determine which of the plurality of assets of the media library make up a subset of assets for use in generating a semantic mapping. This determination may be based on the interaction scores calculated in operation 904. For example, assets which have the highest interaction scores may be included in the subset of assets.

According to one approach, the first information may describe user interactions with the plurality of assets of the media library that have occurred over a most recent period of time. The period of time that is used for collection of the first information may be user selected or automatically determined to provide a snapshot of recent activity by the user, such as the last year, last 6 months, last 3 months, last 6 weeks, last month, last 2 weeks, etc.

In operation 908, the computing device may create a semantic mapping based on a theme. The semantic mapping includes features identified from the subset of assets chosen from the media library. The chosen features that are included in the semantic mapping appear in a particular percentage or threshold number of assets from the subset of assets (e.g., identified objects, scenes, and people in an example). The particular percentage or threshold number of assets may be predetermined and static, or dynamic to ensure a robust data set in the semantic mapping, e.g., a threshold number of features (e.g., 10, 25, 50, 100, 200, 500, etc.) to be included in the semantic mapping. In some approaches, the particular percentage may be in a range from about 50% to about 5%, such as 10%. In one approach, the particular threshold may be based on the total number of assets in the subset of assets. In another approach, a predetermined number of features (e.g., 10, 25, 50, 100, 200, etc.) which appear the most in the subset of assets may be included in the semantic mapping.

The theme may be received by the computing device via user input, may be automatically chosen based on data or information available to the computing device, such as a current date, current time, mood of the user based on recent interactions with other applications, etc. The theme may be used to tailor the features which are included in the semantic mapping and how inclusion or exclusion of such features effects the semantic score of a particular asset.

For example, if the theme is "happy," then images from a funeral, natural disasters, or other melancholy events would not achieve a high semantic score, even if the other features found most often in the subset of assets are well represented in the images. In contrast, images of parties, smiles, and dancing may receive higher semantic scores, as long as the other features found most often in the subset of assets are well represented in the images.

In operation 910, the computing device may generate a plurality of personal aesthetic scores for some or all assets of the media library. The personal aesthetic scores may be generated for a set of highest rated assets based on semantic scores, for the subset of assets, or some other group of assets that may be better analyzed using personal aesthetic scores, such as those that are on the threshold of being used or excluded for display, according to the desired theme.

One personal aesthetic score is generated for each respective asset of the media library. The personal aesthetic scores may be generated according to examples described herein, based on a global aesthetic, and/or in accordance with any other known method of generating individual determinations of how visually pleasing or interesting assets of the media library would be to a particular user based on the desired theme.

In operation 912, the computing device may analyze one or more assets of the media library using the semantic mapping to generate a plurality of semantic scores. The number of assets analyzed may include some or all of the media library, depending on what type or kind of assets or how many assets are desired to be examined. One semantic score is generated for each respective asset of the media library. The analysis may be performed in accordance with previous descriptions, with the theme being a factor in how the various assets score. For example, assets which have content most closely aligned with the theme will receive higher semantic scores than assets which have content unrelated to the theme. In another example, assets which have content that is adverse or contrary to the theme (e.g., sad content versus a happy theme, photos of landscapes versus a theme of family).

In an example, a semantic score for a respective asset may be determined based on a quantity of the identified objects, scenes, and people that appear in the respective asset. In one approach, semantic scores may be normalized in one of several ways, described herein or known in the art. In a further example, a specific feature may be emphasized or de-emphasized in calculating semantic scores by weighting a corresponding semantic value associated with the specific feature more or less.

In operation 914, the computing device may provide the semantic scores and personal aesthetic scores to a second application. The second application may utilize the semantic score, personal aesthetic score, global semantic score, and/or global aesthetic score for each asset to determine whether the respective asset should be displayed in the second application. This determination may be based on identifying first assets of the media library that rate within a first percentage of all assets for at least semantic score (and possibly personal aesthetic score, global semantic score, and/or global aesthetic score), referred to as first tier assets in some descriptions.

In an example, the first percentage may include a percentage in a range from about 1% to about 10% of all assets, such as about 5% of all assets. In another example, a desired number of assets may be chosen for display, such as if the display has space for the certain number of assets in a GUI, then only those select number of assets may be chosen for display in the GUI.

Graphical User Interfaces

This disclosure above describes various Graphical User Interfaces (GUIs) for implementing various features, processes or workflows. These GUIs may be presented on a variety of electronic devices including but not limited to laptop computers, desktop computers, computer terminals, television systems, tablet computers, e-book readers and smart phones. One or more of these electronic devices may include a touch-sensitive surface. The touch-sensitive surface may process multiple simultaneous points of input, including processing data related to the pressure, degree or position of each point of input. Such processing may facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements may be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to provide behavioral curation of assets in a media library to determine key assets of the media library. The present disclosure contemplates that in some instances, this gathered data may include personal information data that uniquely identifies or may be used to contact or locate a specific person. Such personal information data may include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, may be used to the benefit of users. For example, the personal information data may be used to provide behavioral curation of assets to determine key assets of the media library. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements may be provided to prevent or block access to such personal information data. For example, in providing behavioral curation, the present technology may be configured to allow users to select to "opt in" or "opt out" of participation in the collection of personal information data during registration for services or anytime thereafter. In another example, users may select not to provide mood-associated data for targeted content delivery services. In yet another example, users may select to limit the length of time mood-associated data is maintained or entirely prohibit the development of a baseline mood profile which may be used to provide guidance for prominently displaying certain assets of the media library. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk may be minimized by limiting the collection of data and deleting data once it is no longer needed. In addition, and when applicable, including in certain health related applications, data de-identification may be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments may also be implemented without the need for accessing such personal information data. That is, the various embodiments of the present technology are not rendered inoperable due to the lack of all or a portion of such personal information data. For example, certain assets of the media library may be selected and presented to users by inferring preferences based on non-personal information data or a bare minimum amount of personal information, such as the content being requested by the device associated with a user, other non-personal information available to the behavioral curation process, or publicly available information.

Example System Architecture

Figure 10:
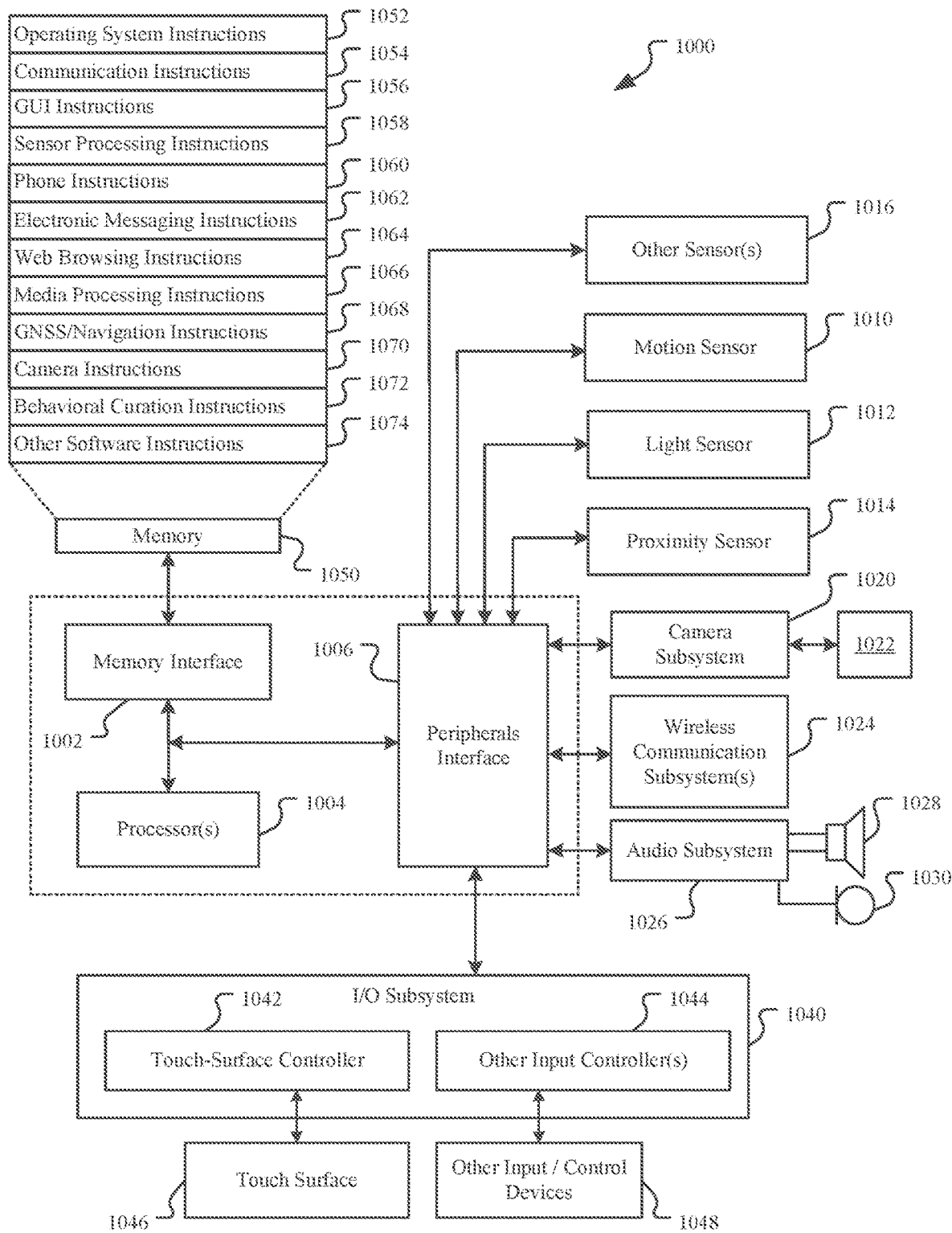
FIG. 10 is a block diagram of an example computing device that may implement the features and processes of FIGS. 1-9.

FIG. 10 is a block diagram of an example computing device 1000 that may implement the features and processes of FIGS. 1-9. The computing device 1000 may include a memory interface 1002, one or more data processors, image processors and/or central processing units 1004, and a peripherals interface 1006. The memory interface 1002, the one or more processors 1004 and/or the peripherals interface 1006 may be separate components or may be integrated in one or more integrated circuits. The various components in the computing device 1000 may be coupled by one or more communication buses or signal lines.

Sensors, devices, and subsystems may be coupled to the peripherals interface 1006 to facilitate multiple functionalities. For example, a motion sensor 1010, a light sensor 1012, and a proximity sensor 1014 may be coupled to the peripherals interface 1006 to facilitate orientation, lighting, and proximity functions. Other sensors 1016 may also be connected to the peripherals interface 1006, such as a global navigation satellite system (GNSS) (e.g., GPS receiver), a temperature sensor, a biometric sensor, magnetometer or other sensing device, to facilitate related functionalities.

A camera subsystem 1020 and an optical sensor 1022, e.g., a charged coupled device (CCD) or a complementary metal-oxide semiconductor (CMOS) optical sensor, may be utilized to facilitate camera functions, such as recording photographs and video clips. The camera subsystem 1020 and the optical sensor 1022 may be used to collect images of a user to be used during authentication of a user, e.g., by performing facial recognition analysis.

Communication functions may be facilitated through one or more wireless communication subsystems 1024, which may include radio frequency receivers and transmitters and/or optical (e.g., infrared) receivers and transmitters. The specific design and implementation of the communication subsystem 1024 may depend on the communication network(s) over which the computing device 1000 is intended to operate. For example, the computing device 1000 may include communication subsystems 1024 designed to operate over a GSM network, a GPRS network, an EDGE network, a Wi-Fi or WiMax network, and a Bluetooth™ network. In particular, the wireless communication subsystems 1024 may include hosting protocols such that the device 100 may be configured as a base station for other wireless devices.

An audio subsystem 1026 may be coupled to a speaker 1028 and a microphone 1030 to facilitate voice-enabled functions, such as speaker recognition, voice replication, digital recording, and telephony functions. The audio subsystem 1026 may be configured to facilitate processing voice commands, voiceprinting and voice authentication, for example.

The I/O subsystem 1040 may include a touch-surface controller 1042 and/or other input controller(s) 1044. The touch-surface controller 1042 may be coupled to a touch surface 1046. The touch surface 1046 and touch-surface controller 1042 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 may be coupled to other input/control devices 1048, such as one or more buttons, rocker switches, thumb-wheel, infrared port, USB port, and/or a pointer device such as a stylus. The one or more buttons (not shown) may include an up/down button for volume control of the speaker 1028 and/or the microphone 1030.

In one implementation, a pressing of the button for a first duration may disengage a lock of the touch surface 1046; and a pressing of the button for a second duration that is longer than the first duration may turn power to the computing device 1000 on or off. Pressing the button for a third duration may activate a voice control, or voice command, module that enables the user to speak commands into the microphone 1030 to cause the device to execute the spoken command. The user may customize a functionality of one or more of the buttons. The touch surface 1046 may, for example, also be used to implement virtual or soft buttons and/or a keyboard.

In some implementations, the computing device 1000 may present recorded audio and/or video files, such as MP3, AAC, and MPEG files. In some implementations, the computing device 1000 may include the functionality of an MP3 player, such as an iPod™.

The memory interface 1002 may be coupled to memory 1050. The memory 1050 may include high-speed random-access memory and/or non-volatile memory, such as one or more magnetic disk storage devices, one or more optical storage devices, and/or flash memory (e.g., NAND, NOR). The memory 1050 may store an operating system 1052, such as Darwin, RTXC, LINUX, UNIX, OS X, WINDOWS, or an embedded operating system such as VxWorks.

The operating system 1052 may include instructions for handling basic system services and for performing hardware dependent tasks. In some implementations, the operating system 1052 may be a kernel (e.g., UNIX kernel). In some implementations, the operating system 1052 may include instructions for performing voice authentication. For example, operating system 1052 may implement the behavioral curation features as described with reference to FIGS. 1-9.

The memory 1050 may also store communication instructions 1054 to facilitate communicating with one or more additional devices, one or more computers and/or one or more servers. The memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and instructions; and/or camera instructions 1070 to facilitate camera-related processes and functions.

The memory 1050 may store software instructions 1072 to facilitate other processes and functions, such as the behavioral curation processes and functions as described with reference to FIGS. 1-9.

The memory 1050 may also store other software instructions 1074, such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 1050 may include additional instructions or fewer instructions. Furthermore, various functions of the computing device 1000 may be implemented in hardware and/or in software, including in one or more signal processing and/or application specific integrated circuits.

What is claimed is:

1. A method comprising:
generating, by a computing device, a plurality of interaction scores based on user interactions with a plurality of assets of a media library, one interaction score for each respective asset in the plurality of assets, wherein the user sharing a particular asset alone results in a higher interaction score for the particular asset than the user sharing the particular asset within a group including other assets;
selecting, by the computing device, a subset of assets from the plurality of assets based on the plurality of interaction scores;
identifying, by the computing device, a plurality of elements that each appear in at least one asset of the subset of assets, the elements comprising objects, scenes, and people;
creating, by the computing device, semantic mappings for a first subset of the plurality of elements without creating semantic mappings for a second subset of the plurality of elements at least by:
determining, by the computing device, whether a first element of the plurality of elements appears in at least a particular percentage of the subset of assets, the particular percentage being less than 100%;
responsive to determining that the first element appears in at least the particular percentage of the subset of assets: creating, by the computing device, a semantic mapping comprising the first element and a corresponding element semantic score assigned to the first element, wherein the element semantic score numerically represents a user's preference for the first element;
determining, by the computing device, whether a second element of the plurality of elements appears in at least the particular percentage of the subset of assets; and
responsive to determining that the second element does not appear in at least the particular percentage of the subset of assets, refraining from creating any semantic mapping for the second element;
computing, by the computing device, a first asset semantic score for a first asset in the plurality of assets based on a first set of element semantic scores corresponding to elements of the first subset of elements in the first asset;
computing, by the computing device, a second asset semantic score for a second asset in the plurality of assets based on a second set of element semantic scores corresponding to elements of the first subset of elements in the second asset; and
based at least on the first asset semantic score being higher than the second asset semantic score: presenting, by the computing device, the first asset more prominently than the second asset in a user interface of the computing device.

2. The method as recited in claim 1, wherein an asset semantic score for a respective asset is determined based on a quantity of the identified objects, scenes, and people from the first subset of the elements that appear in the respective asset, and wherein presenting the first asset more prominently than the second asset comprises showing, in the user interface, the first asset larger than the second asset.

3. The method as recited in claim 1, wherein selecting the subset of assets from the plurality of assets comprises:
obtaining, by the computing device, first information describing user interactions with the plurality of assets of the media library,
wherein the plurality of interaction scores based on the first information.

4. The method as recited in claim 3, wherein the interaction scores are based on, for each respective asset in the media library, a number of times the respective asset is viewed, a number of times the respective asset is played, whether each respective asset has been marked as a favorite, and a number of times the respective asset is shared with one or more other people.

5. The method as recited in claim 1, further comprising:
generating, by the computing device, a plurality of personal aesthetic scores using a first algorithm, one personal aesthetic score for each respective asset of the media library,
wherein the first assets of the media library rate within a first percentage of all assets for asset semantic score and personal aesthetic score, and
wherein each personal aesthetic score rates how aesthetically pleasing a respective asset is compared to a global aesthetic, the global aesthetic representing a maximum aesthetic score possible using the first algorithm.

6. The method as recited in claim 5, further comprising:
determining, by the computing device, second assets of the media library that rate within the first percentage of all assets for asset semantic score or personal aesthetic score and rate within a second percentage for asset semantic score and personal aesthetic score, wherein the first percentage is less than the second percentage; and in response to a determination that no first assets correspond to a current view of the user interface, presenting, by the computing device, at least one of the second assets prominently in the user interface of the computing device.

7. The method as recited in claim 5, further comprising: determining, by the computing device, a set of aesthetically pleasing assets that have personal aesthetic scores greater than a first threshold amount of the global aesthetic, wherein the first assets of the media library are selected from the set of aesthetically pleasing assets.

8. A system comprising:
one or more processors; and
a non-transitory computer-readable medium including one or more sequences of instructions that, when executed by the one or more processors, cause the one or more processors to perform operations comprising:
   generating a plurality of interaction scores based on user interactions with a plurality of assets from a media library, one interaction score for each respective asset in the plurality of assets, wherein the user sharing a particular asset alone results in a higher interaction score for the particular asset than the user sharing the particular asset within a group including other assets;
   selecting a subset of assets from the plurality of assets based on the plurality of interaction scores;
   identifying a plurality of elements that each appear in at least one asset of the subset of assets, the elements comprising objects, scenes, and people;
   creating semantic mappings for a first subset of the plurality of elements without creating semantic mappings for a second subset of the plurality of elements at least by:
      determining whether a first element of the plurality of elements appears in at least a particular percentage of the subset of assets, the particular percentage being less than 100%;
      responsive to determining that the first element appears in at least the particular percentage of the subset of assets: creating a semantic mapping comprising the first element and a corresponding element semantic score assigned to the first element, wherein the element semantic score numerically represents a user's preference for the first element;
      determining whether a second element of the plurality of elements appears in at least the particular percentage of the subset of assets; and
      responsive to determining that the second element does not appear in at least the particular percentage of the subset of assets, refraining from creating any semantic mapping for the second element;
   computing a first asset semantic score for a first asset in the plurality of assets based on a first set of element semantic scores corresponding to elements of the first subset of elements in the first asset;
   computing a second asset semantic score for a second asset in the plurality of assets based on a second set of element semantic scores corresponding to elements of the first subset of elements in the second asset; and
   based at least on the first asset semantic score being higher than the second asset semantic score: presenting the first asset more prominently than the second asset in a user interface of a computing device.

9. The system as recited in claim 8, wherein an asset semantic score for a respective asset is determined based on a quantity of the identified objects, scenes, and people from the first subset of the elements that appear in the respective asset, and wherein presenting the first asset more prominently than the second asset comprises showing, in the user interface, the first asset larger than the second asset.

10. The system as recited in claim 8, wherein selecting the subset of assets from the plurality of assets comprises:
   obtaining first information describing user interactions with the plurality of assets of the media library,
   wherein the plurality of interaction scores are based on the first information.

11. The system as recited in claim 8, wherein the operations further comprise:
   generating a plurality of personal aesthetic scores using a first algorithm, one personal aesthetic score for each respective asset of the media library,
   wherein the first assets of the media library rate within a first percentage of all assets for asset semantic score and personal aesthetic score, and
   wherein each personal aesthetic score rates how aesthetically pleasing a respective asset is compared to a global aesthetic, the global aesthetic representing a maximum aesthetic score possible using the first algorithm.

12. The system as recited in claim 11, wherein the operations further comprise:
   determining second assets of the media library that rate within the first percentage of all assets for asset semantic score or personal aesthetic score and rate within a second percentage for asset semantic score and personal aesthetic score, wherein the first percentage is smaller than the second percentage;
   in response to no first assets corresponding to a current view of the media library, presenting at least one of the second assets prominently in the user interface of the computing device; and
   determining a set of aesthetically pleasing assets that have personal aesthetic scores greater than a first threshold amount of the global aesthetic, wherein the first assets of the media library are selected from the set of aesthetically pleasing assets.

13. A non-transitory computer-readable medium including one or more sequences of instructions that, when executed by one or more processors, cause the one or more processors to perform operations comprising:
   generating a plurality of interaction scores based on user interactions with a plurality of assets from a media library, one interaction score for each respective asset in the plurality of assets, wherein the user sharing a particular asset alone results in a higher interaction score for the particular asset than the user sharing the particular asset within a group including other assets;
   selecting a subset of assets from the plurality of assets based on the plurality of interaction scores;
   identifying a plurality of elements that each appear in at least one asset of the subset of assets, the elements comprising objects, scenes, and people;
   creating semantic mappings for a first subset of the plurality of elements without creating semantic mappings for a second subset of the plurality of elements at least by:
      determining whether a first element of the plurality of elements appears in at least a particular percentage of the subset of assets, the particular percentage being less than 100%;

responsive to determining that the first element appears in at least the particular percentage of the subset of assets: creating a semantic mapping comprising the first element and a corresponding element semantic score assigned to the first element, wherein the element semantic score numerically represents a user's preference for the first element;
determining whether a second element of the plurality of elements appears in at least the particular percentage of the subset of assets; and
responsive to determining that the second element does not appear in at least the particular percentage of the subset of assets, refraining from creating any semantic mapping for the second element;
computing a first asset semantic score for a first asset in the plurality of assets based on a first set of element semantic scores corresponding to elements of the first subset of elements in the first asset;
computing a second asset semantic score for a second asset in the plurality of assets based on a second set of element semantic scores corresponding to elements of the first subset of elements in the second asset; and
based at least on the first asset semantic score being higher than the second asset semantic score: presenting the first asset more prominently than the second asset in a user interface of a computing device.

14. The non-transitory computer-readable medium as recited in claim 13, wherein an asset semantic score for a respective asset is determined based on a quantity of the identified objects, scenes, and people from the first subset of the elements that appear in the respective asset, and wherein presenting the first asset more prominently than the second asset comprises showing, in the user interface, the first asset larger than the second asset.

15. The non-transitory computer-readable medium as recited in claim 13, wherein selecting the subset of assets from the plurality of assets comprises:
obtaining first information describing user interactions with the plurality of assets of the media library,
wherein the plurality of interaction scores based on the first information.

16. The non-transitory computer-readable medium as recited in claim 13, wherein the operations further comprise:
generating a plurality of personal aesthetic scores using a first algorithm, one personal aesthetic score for each respective asset of the media library,
wherein the first assets of the media library rate within a first percentage of all assets for asset semantic score and personal aesthetic score, and
wherein each personal aesthetic score rates how aesthetically pleasing a respective asset is compared to a global aesthetic, the global aesthetic representing a maximum aesthetic score possible using the first algorithm.

17. The non-transitory computer-readable medium as recited in claim 16, wherein the operations further comprise:
determining second assets of the media library that rate within the first percentage of all assets for asset semantic score or personal aesthetic score and rate within a second percentage for asset semantic score and personal aesthetic score, wherein the first percentage is smaller than the second percentage; and
in response to no first assets corresponding to a current view of the media library, presenting at least one of the second assets prominently in the user interface of the computing device; and
determining a set of aesthetically pleasing assets that have personal aesthetic scores greater than a first threshold amount of the global aesthetic, wherein the first assets of the media library are selected from the set of aesthetically pleasing assets.

* * * * *